US010664991B2

(12) United States Patent
Sugimoto

(10) Patent No.: US 10,664,991 B2
(45) Date of Patent: May 26, 2020

(54) ATTENTION POSITION RECOGNIZING APPARATUS, IMAGE PICKUP APPARATUS, DISPLAY APPARATUS, ATTENTION POSITION RECOGNIZING METHOD AND PROGRAM

(71) Applicant: FUJIFILM Corporation, Tokyo (JP)

(72) Inventor: Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/244,941

(22) Filed: Jan. 10, 2019

(65) Prior Publication Data
US 2019/0147618 A1 May 16, 2019

Related U.S. Application Data

(63) Continuation of application No. PCT/JP2017/020842, filed on Jun. 5, 2017.

(30) Foreign Application Priority Data

Jul. 20, 2016 (JP) .................. 2016-142484

(51) Int. Cl.
*H04N 5/228* (2006.01)
*G06T 7/73* (2017.01)
(Continued)

(52) U.S. Cl.
CPC ............... *G06T 7/74* (2017.01); *G03B 7/091* (2013.01); *G03B 17/00* (2013.01); *G06F 3/013* (2013.01);
(Continued)

(58) Field of Classification Search
CPC ......... H04N 5/23219; G06T 7/70; G06T 7/73; G06T 7/74; G06K 9/00604; G06K 9/00597; G06K 9/0061
See application file for complete search history.

(56) References Cited

U.S. PATENT DOCUMENTS 5,392,091 A 2/1995 Iwasaki
5,835,797 A 11/1998 Odaka
(Continued)

FOREIGN PATENT DOCUMENTS

JP 5-53043 A 3/1993
JP 7-199042 A 4/1995
(Continued)

OTHER PUBLICATIONS

International Preliminety Report on Patentability and Written Opinion of the International Searching Authority for International Application No. PCT/JP2017/020842, dated Jan. 31, 2019, with English translation of the Written Opinion.
(Continued)

*Primary Examiner* — Kelly L Jerabek
(74) *Attorney, Agent, or Firm* — Birch, Stewart, Kolasch & Birch, LLP

(57) ABSTRACT

There is provided an attention position recognizing apparatus, an image pickup apparatus, a display apparatus, an attention position recognizing method, and a program, in which it is possible to reliably recognize a position of a portion, to which attention is paid by a user, in an image. A gaze analyzing unit that performs detection of a gaze position of the user and determination of whether or not the gaze position is stable, as a gaze analysis of the user, an image analyzing unit that performs image analysis of the acquired image, and an attention position recognizing unit that recognizes an attention position which is a position of a portion in the image, to which attention is paid by the user, based on the result of the gaze analysis and the result of the image analysis.

14 Claims, 15 Drawing Sheets

(51) Int. Cl.
*G03B 17/00* (2006.01)
*H04N 9/04* (2006.01)
*G03B 7/091* (2006.01)
*G06F 3/0485* (2013.01)
*G06T 7/20* (2017.01)
*G06F 3/01* (2006.01)
*G06F 3/0484* (2013.01)
*H04N 5/232* (2006.01)
*G06F 3/147* (2006.01)
*G06K 9/00* (2006.01)

(52) U.S. Cl.
CPC ........ *G06F 3/0485* (2013.01); *G06F 3/04842* (2013.01); *G06F 3/147* (2013.01); *G06K 9/0061* (2013.01); *G06K 9/00604* (2013.01); *G06T 7/20* (2013.01); *H04N 5/232* (2013.01); *H04N 5/23219* (2013.01); *H04N 9/045* (2013.01); *G06T 2207/30201* (2013.01)

(56) References Cited

U.S. PATENT DOCUMENTS

| | | | |
|---|---|---|---|
| 6,191,819 B1 | 2/2001 | Nakano | |
| 6,388,707 B1 | 5/2002 | Suda | |
| 9,958,938 B2* | 5/2018 | Thorn | ............... G06T 17/00 |
| 2011/0298702 A1* | 12/2011 | Sakata | ............... G06F 3/013 |
| | | | 345/156 |
| 2012/0272179 A1* | 10/2012 | Stafford | ............... G06F 3/012 |
| | | | 715/781 |
| 2015/0022682 A1 | 1/2015 | Seita | |
| 2015/0235398 A1* | 8/2015 | Kim | ............... G06F 3/011 |
| | | | 345/633 |
| 2015/0241967 A1* | 8/2015 | Saripalle | ............... G06F 3/013 |
| | | | 382/195 |
| 2016/0335475 A1* | 11/2016 | Krenzer | ............... G06K 9/00335 |

FOREIGN PATENT DOCUMENTS

| | | |
|---|---|---|
| JP | 7-184089 A | 7/1995 |
| JP | 8-9237 A | 1/1996 |
| JP | 2001-116985 A | 4/2001 |
| JP | 2004-64409 A | 2/2004 |
| JP | 2015-22207 A | 2/2015 |
| JP | 2015-162822 A | 9/2015 |

OTHER PUBLICATIONS

International Search Rport for International Application No. PCT/JP2017/020842 dated Sep. 5, 2017, with English Translation.
Japanese Office Action, dated Mar. 27, 2020, for corresponding Japanese Application No. 2018-528440, with an English translation.

* cited by examiner

ATTENTION POSITION RECOGNIZING APPARATUS, IMAGE PICKUP APPARATUS, DISPLAY APPARATUS, ATTENTION POSITION RECOGNIZING METHOD AND PROGRAM

CROSS-REFERENCE TO RELATED APPLICATIONS

The present application is a Continuation of PCT International Application No. PCT/JP2017/020842 filed on Jun. 5, 2017 claiming priority under 35 U.S.C § 119(a) to Japanese Patent Application No. 2016-142484 filed on Jul. 20, 2016. Each of the above applications is hereby expressly incorporated by reference, in their entirety, into the present application.

BACKGROUND OF THE INVENTION

1. Field of the Invention

The present invention relates to an attention position recognizing apparatus, an image pickup apparatus, a display apparatus, an attention position recognizing method, and a program, in which it is possible to reliably recognize a position of a portion, to which attention is paid by the user, in an image.

2. Description of the Related Art

There is known a technique for recognizing a subject to which a gaze of a user is directed by detecting the gaze of the user.

JP2004-64409A discloses that the subject is imaged in a case where the gaze of the user is determined to be directed to the same subject over a certain time period.

JP2001-116985A discloses that, in a case where image clipping processing is performed based on a result of the detection of a gaze position of a user and a result of the measurement of a subject distance, in order to prevent a clipping mistake due to a detection error of the gaze position, the actual size information of the subject and a correspondence relationship between the actual size information of the subject and a processing range are set in advance and the processing range appropriate for the actual size of the subject is obtained.

JP2015-162822A discloses that a portion of a subject (for example, a face of a dog and a face of a cat) detected by image recognition in a live view image is clipped off and displayed enlargedly, and a gaze position of a user with respect to the enlargedly displayed portion (for example, a position of the eye of the dog) is detected and focusing is performed.

JP1995-199042A (JP1995-199042A (JP-H07-199042A)) discloses that a focus-detected region is selected according to a gaze position of a user, it is determined whether or not a subject is a moving body based on the changing status of a defocus amount of the focus-detected region, and the number of times of gaze detecting operation is switched depending on whether or not the subject is the moving body.

SUMMARY OF THE INVENTION

However, it is actually difficult to reliably recognize a position to which attention is paid by the user. This is because a person is not always able to gaze at the attention position continuously over a certain time period.

Even if the person is conscious of maintaining a fixed gaze at the attention position, the gaze position generally varies unconsciously. Therefore, there is a possibility that, in a case where an attention position is recognized using a result of the gaze detection as it is, an inappropriate position is recognized as the attention position.

Since the invention disclosed in JP2004-64409A merely determines whether or not the gaze of the user has been directed to the same subject over a certain time period, it is not always possible to image the subject to which attention has been paid by the user, in a case where the gaze position of the user is unstable (for example, in a case where the gaze is temporarily shifted from the subject to which the user has paid attention).

The invention disclosed in JP2001-116985A is configured such that, in consideration of the detection error of the gaze position, in short, a size of the clipped range of the image is set to be slightly larger than the size corresponding to the actual size of the subject, but does not mean that the recognition accuracy of the attention position of the user is improved.

Since the invention disclosed in JP2015-162822A is configured such that an image recognition technique is used for clipping off and enlargedly displaying a portion of a subject in a live view image, and does not means that the attention position is recognized based on a result of determination whether or not the gaze position is stable and an image recognition result, it is considered that, in the case where the gaze position of the user is unstable, the attention position of the user may not be recognized.

The invention disclosed in JP1995-199042A (JP-H07-199042A) is configured such that the number of times of gaze detecting operation is switched by determining whether or not the subject is a moving body based on the changing state of the defocus amount, and there is a possibility that, in a case where the gaze position of the user is unstable, the attention position of the user may not be recognized.

As described above, JP2004-64409A, JP2001-116985A, JP2015-162822A, and JP1995-199042A (JP-H07-199042A) do not specifically disclose and suggest that the attention position of the user is recognized based on both a result of gaze analysis and a result of image analysis, and it is considered that it is difficult to reliably recognize the attention position of the user in a case where the gaze position of the user is unstable, even by using the techniques disclosed in JP2004-64409A, JP2001-116985A, JP2015-162822A, and JP1995-199042A (JP-H07-199042A).

An object of the present invention is to provide an attention position recognizing apparatus, an image pickup apparatus, a display apparatus, an attention position recognizing method, and a program, in which it is possible to reliably recognize a position of a portion, to which attention is paid by the user, in an image.

In order to achieve the above-mentioned object, according to a first aspect of the present invention, there is provided an attention position recognizing apparatus comprising: a gaze analyzing unit that performs detection of a gaze position of a user and determination whether or not the gaze position is stable, as gaze analysis of the user; an image acquiring unit that acquires an image; an image analyzing unit that performs image analysis of the acquired image; and an attention position recognizing unit that recognizes an attention position which is a position of a portion, to which attention is paid by the user, in the image based on a result of the gaze analysis and a result of the image analysis.

According to this aspect, the detection of the gaze position of the user and the determination whether or not the gaze position is stable are performed as the gaze analysis of the user, the image analysis of the acquired image is performed, and the attention position in the image is recognized based on both the result of the gaze analysis and the result of the image analysis, so that it is possible to reliably recognize the attention position in the image.

In the attention position recognizing apparatus according to a second aspect of the present invention, in a case where it is determined that the gaze position is stable, the attention position recognizing unit adopts the detected gaze position as the attention position. According to this aspect, in a case where it is determined that the gaze position is stable, the gaze position is adopted as the attention position, so that the attention position in the image is reliably recognized.

In the attention position recognizing apparatus according to the third aspect of the present invention, the image analyzing unit performs determination whether or not the image is stable, and in a case where it is determined that the gaze position is unstable, the attention position recognizing unit recognizes the attention position based on a result of the determination whether or not the image is stable. According to this aspect, in a case where it is determined that the gaze position is unstable, the attention position is recognized based on the result of determination whether or not the image is stable, so that the attention position in the image is reliably recognized.

In the attention position recognizing apparatus according to the fourth aspect of the present invention, in a case where it is determined that the gaze position is unstable and it is determined that the image is stable, the attention position recognizing unit filters the detected gaze position in time series to be adopted as the attention position. According to this aspect, in a case where it is determined that the gaze position is unstable and the image is stable, the detected gaze position is filtered in time series and adopted as the attention position, so that the attention position in the image is reliably recognized.

In the attention position recognizing apparatus according to the fifth aspect of the present invention, in a case where it is determined that the gaze position is unstable and it is determined that the image is stable, the attention position recognizing unit estimates an attention portion in the image based on the result of image analysis and adopts a position of the estimated attention portion in the image as the attention position. According to this aspect, in a case where it is determined that the gaze position is unstable and the image is stable, the attention portion is estimated based on the image, and the position of the estimated attention portion in the image is adopted as the attention position, so that the attention position in the image is reliably recognized.

In the attention position recognizing apparatus according to the sixth aspect of the present invention, in a case where it is determined that the gaze position is unstable and it is determined that the image is unstable, the attention position recognizing unit compares a movement of the detected gaze position with a movement in the image and determines whether or not to adopt the detected gaze position as the attention position. According to this aspect, in a case where it is determined that the gaze position is unstable and the image is unstable, the movement of the detected gaze position is compared with the movement in the image, and it is determined whether or not to adopt the detected gaze position as the attention position, so that the attention position in the image is reliably recognized.

In the attention position recognizing apparatus according to the seventh aspect of the present invention, in a case where it is determined that the gaze position is unstable and it is determined that the image is unstable, the attention position recognizing unit estimates an attention portion in the image based on a result of the image analysis and compares the movement of the detected gaze position with the movement of the estimated attention portion in the image, and determines whether or not to use the detected gaze position as the attention position. According to this aspect, in a case where it is determined that the gaze position is unstable and the image is unstable, the attention portion is estimated based on the image, the movement of the detected gaze position and the movement of the estimated attention portion in the image are compared with each other, and it is determined whether or not to determine the detected gaze position as the attention position, so that the attention position in the image is reliably recognized.

In the attention position recognizing apparatus according to the eighth aspect of the present invention, in a case where it is determined that the gaze position is unstable, the attention position recognizing unit compares the movement of the detected gaze position with the movement in the image, and determines whether or not to adopt the detected gaze position as the attention position. According to this aspect, even though the gaze position is unstable, in a case where there is a correlation between the movement of the gaze position and the movement of the estimated attention portion in the image, it is possible to reliably recognize the attention position in the image.

In the attention position recognizing apparatus according to a ninth aspect of the present invention, in a case where it is determined that the gaze position is stable, the attention position recognizing unit increases a weight of the result of the gaze analysis to be larger than a case where it is determined that the gaze position is unstable, to recognize an attention position.

An image pickup apparatus according to a tenth aspect of the present invention comprises the attention position recognizing apparatus described above, and uses an imaging unit for imaging a subject as an image acquiring unit.

An image pickup apparatus according to an eleventh aspect of the present invention performs at least one of automatic focus adjustment, automatic exposure, or automatic color balance correction, using the attention position recognized based on the result of gaze analysis and the result of analysis of an image obtained by the imaging.

A display apparatus according to a twelfth aspect of the present invention comprises the attention position recognizing apparatus described above and a display unit that displays the image.

According to a thirteenth aspect of the present invention, there is provided an attention position recognizing method, comprising: a step of performing detection of a gaze position of a user and determination whether or not the gaze position is stable, as gaze analysis of the user; a step of acquiring an image; a step of performing image analysis of the acquired image; and a step of recognizing an attention position that is a position of a portion, to which attention is paid by the user, in the image based on a result of the gaze analysis and a result of the image analysis.

According to a fourteenth aspect of the present invention, there is provided a program that causes a computer to execute: a step of performing detection of a gaze position of a user and determination whether or not the gaze position is stable, as gaze analysis of the user; a step of acquiring an image; a step of performing image analysis of the acquired image; and a step of recognizing an attention position that is a position of a portion, to which attention is paid by the user, in the image based on a result of the gaze analysis and a result of the image analysis.

According to embodiments of the invention, it is possible to reliably recognize the position of the portion, to which attention is paid by the user, in the image.

DESCRIPTION OF THE PREFERRED EMBODIMENTS

Hereinafter, embodiments for implementing an attention position recognizing apparatus, an image pickup apparatus, a display apparatus, an attention position recognizing method and a program according to the invention will be described with reference to the accompanying drawings.

<Basic Configuration Example>

Figure 1:
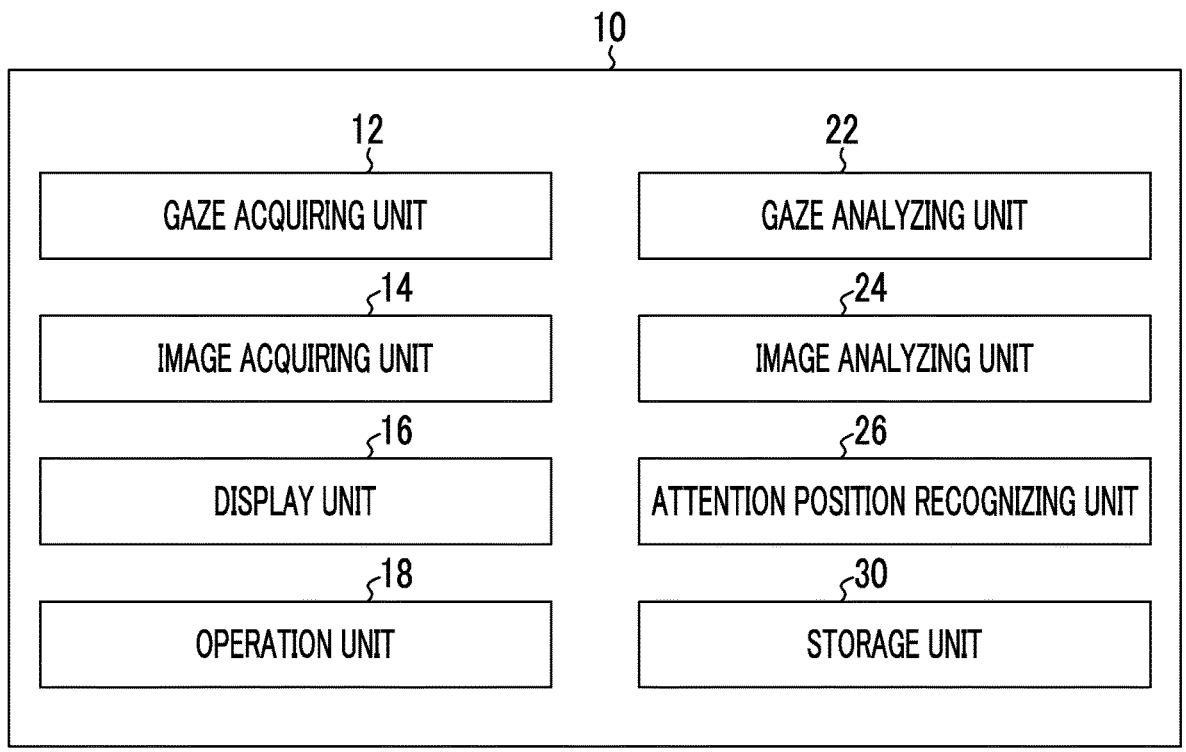
FIG. 1 is a block diagram showing a basic configuration example of an attention position recognizing apparatus according to an embodiment of the present invention.

FIG. 1 is a block diagram showing a basic configuration example of an attention position recognizing apparatus according to an embodiment of the present invention.

The attention position recognizing apparatus 10 comprises a gaze acquiring unit 12 that acquires information indicating a movement of an eye of a user, an image acquiring unit 14 that acquires an image, a display unit 16 that displays the acquired image, an operation unit 18 that accepts an operation by a user, a gaze analyzing unit 22 that performs detection of a gaze position of the user and determination whether or not the gaze position of the user is stable, as gaze analysis of the user, an image analyzing unit 24 that performs image analysis of the acquired image, an attention position recognizing unit 26 that recognizes an attention position in the image by using a result of the gaze analysis of the gaze analyzing unit 22 and a result of the image analysis of the image analyzing unit 24, and a storage unit 30 that stores a program and information required for executing the program.

In the present specification, the "attention position" is the position of a portion, to which attention is paid by the user, in the image. For example, in a case where a subject existing in the field of view of a user is imaged by an image pickup device such as a digital camera, an attention subject image (also referred to as a "main subject image") in the image corresponding to an attention subject (also referred to as a "main subject") in a real space, to which attention is paid by the user, corresponds to "a portion, to which attention is paid by the user, in the image". In a non-imaging image, a portion (also referred to as an "attention target" or "attention object"), to which attention is paid by the user, in the image displayed on the display unit 16 is equivalent to "a portion, to which attention is paid by the user, in the image". An image obtained by imaging by the image pickup device may be displayed on the display unit 16 and a portion, to which attention is paid by the user, in the image displayed on the display unit 16 may be determined to be used as "a portion, to which attention is paid by the user, in the image".

The gaze acquiring unit 12 acquires, for example, a face image of the user, as information indicating the movement of an eye of the user required for analyzing the gaze of the user by the gaze analyzing unit 22. For example, in a case where a camera (hereinafter, referred to as a "visible light camera") that images visible light is used as the gaze acquiring unit 12, by imaging the face of the user by a visible light camera, for example, an image indicating a correspondence relationship between the position of the inner corner of an eye and the position of an iris is acquired as information indicating the movement of the eye of the user. For example, in a case where a camera (hereinafter, referred to as an "infrared light camera") that images infrared light is used as the gaze acquiring unit 12, by imaging the face of the user in a state of being irradiated with infrared light by the infrared light camera, for example, an image indicating a correspondence relationship between the position of a corneal reflex point and the position of a pupil is acquired as information indicating the movement of the eye of the user.

The image acquiring unit 14 is a device that acquires an image, and as examples thereof, there may be mentioned an image pickup device, a communication device, and a recording medium interface device. In a case where an image pickup device is used as the image acquiring unit 14, there is acquired an image obtained by imaging a subject in the field of view of the user by the image pickup device. In a case where a communication device is used as the image acquiring unit 14, there is acquired an image from the outside. In a case where a recording medium interface device is used as the image acquiring unit 14, there is acquired an image from a recording medium. The "image" is, for example, a motion picture at a certain frame rate. A plurality of still images consecutively photographed may be used. A time interval of the plurality of still images to configure the "image" may not be at a certain time interval.

The display unit 16 is configured with a display device such as a liquid crystal display device.

The operation unit 18 is a device that accepts an operation of the user. For example, the operation unit 18 is configured with a touch panel overlapped on the display screen of the display unit 16.

The gaze analyzing unit 22, the image analyzing unit 24, and the attention position recognizing unit 26 may be configured with a central processing unit (CPU). The gaze analyzing unit 22, the image analyzing unit 24, and the attention position recognizing unit 26 may be configured with a plurality of CPUs. The CPU is one embodiment of a computer.

In addition to a function (a gaze position detecting function) of detecting the gaze position of the user, the gaze analyzing unit 22 has a function (a gaze position stability determining function) of determining whether or not the gaze position of the user is stable in time series. A specific example of the functions will be described later.

The image analyzing unit 24 has a function (an image stability determining function) of determining whether or not the image is stable in time series. A specific example of the functions will be described later.

In a case where it is determined by the gaze analyzing unit 22 that the gaze position is stable, the attention position recognizing unit 26 in this example adopts the gaze position detected by the gaze analyzing unit 22 as the attention position. In a case where it is determined by the gaze analyzing unit 22 that the gaze position is unstable, the attention position recognizing unit 26 in this example recognizes the attention position in the image based on a result of determination whether or not the image is stable, by the image analyzing unit 24. There are various kinds of recognition aspects of the attention position as will be described later in detail.

The storage unit 30 is configured by including a non-transitory storage device. The storage unit 30 in this example is configured by including a random access memory (RAM) that is a transitory storage device, and a read only memory (ROM) and an electrically erasable programmable read-only memory (EEPROM) that are a non-transitory storage device. As the non-transitory storage device, a removable storage device (for example, a memory card) to be attachable to or detachable from the main body of the attention position recognizing apparatus 10 may be used. A non-transitory storage device such as an optical disk and a magnetic disk may also be used.

<Example of Stability Determination of Gaze Position>

In the present specification, the fact that the gaze position is "stable" means that "the gaze position of the user in the image is stable in time series". The gaze analyzing unit 22 determines whether or not the gaze position of the user in the image is stable in time series, as a gaze position stability determining function. Hereinafter, an example of determination by the gaze analyzing unit 22 will be described.

Figure 2:
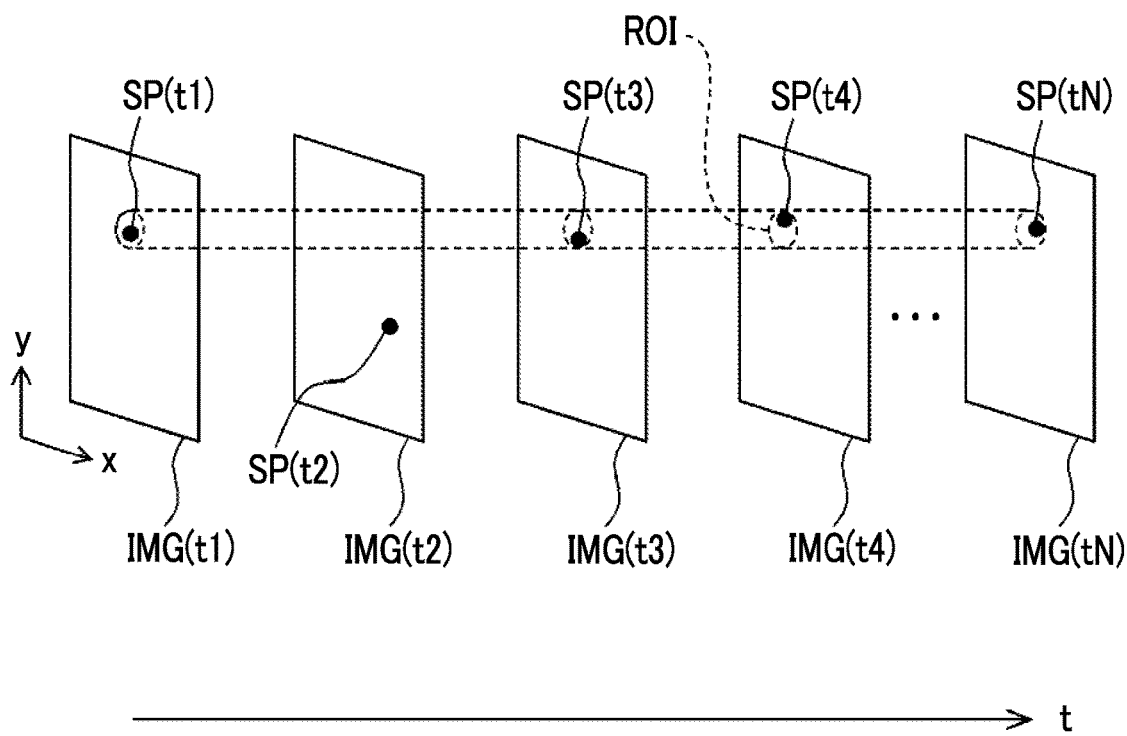
FIG. 2 shows an example in which a gaze position in an image varies with the lapse of time.

FIG. 2 shows an example in which a gaze position SP in an image IMG varies with the lapse of time t. A person is not always able to maintain a fixed gaze on the attention portion (also referred to as a "region of interest") in the image IMG for a certain time period (for example, three seconds) or more. As shown in FIG. 2, in the images IMG(t1) to IMG(tN) ranging from time t1 to tN, there is a time (t2 in this example) at which the gaze position SP is temporarily moved away from an attention portion ROI (an attention subject image) corresponding to the attention subject (for example, a face of an animal) in the real space. It is considered that the gaze position SP is moved away from the attention portion ROI in this way.

As a first determination aspect of the stability of the gaze position, there is an aspect in which, it is determined whether or not the gaze position SP has existed continuously within a predetermined range of the image IMG for a predetermined time and in a case where it has existed continuously for a predetermined time or more, it is determined that "stability is provided". Here, the "predetermined range" and the "predetermined time" are not limited to a case where they are fixed, and may be a variable set range or time. For example, in FIG. 2, in a case where the gaze position SP of the user has existed in the attention portion ROI from times t3 to tN, and in a case where time shorter than the time from times t3 to tN is set as the "predetermined time", it is determined that "stability" is provided. Although this determination aspect is preferable in that determination processing is simple, individual differences in the variation of the gaze positions are likely to affect a result (stability/instability) of stability determination of the gaze position. However, as will be described later, in the attention position recognizing unit 26, it is possible to improve the recognition accuracy of the attention position by recognizing the attention position based on both the result of gaze analysis and the result of image analysis.

As a second determination aspect of the stability of the gaze position, there is an aspect in which, an absolute value (magnitude of a movement vector) of the variation amount of the gaze positions SP is integrated over a predetermined time and in a case where an integral value is equal to or less than a threshold value, it is determined that "stability is provided". Here, the "predetermined time" and the "threshold value" are not limited to the case where they are fixed, but may be variable set values. For example, in FIG. 2, although the gaze position SP(t2) at the time t2 deviates from the attention portion ROI, in a case where the integral value of the absolute value of the variation amount of the gaze positions SP(t1) to SP(tN) from the times t1 to tN is equal to or less than the threshold value, it is determined that "stability is provided". In this determination aspect, the result of determination is stability against the variation of the gaze positions. As described above, even though the gaze position temporarily largely varies, it is preferable to determine that "stability is provided" in a case where the gaze position is stable in most of the predetermined time. The integral value may be calculated, for example, by integrating the absolute value (magnitude of the movement vector) of the variation amount of coordinates (x, y) of the gaze positions SP(t1) to SP(tN) in the image IMG. The image IMG may be divided into a plurality of divided blocks, and the integral value of the absolute value (number of blocks) of the movement amount between the divided blocks of the gaze positions SP(t1) to SP(tN) in the image IMG may be calculated and compared with the threshold value.

The determination aspects of the stability of the gaze position are not limited to the first determination aspect and the second determination aspect as described above. For example, in a case where the ratio of the time, when the gaze position SP has existed in the predetermined range (for example, a face image portion) in the image, to a certain time period (for example, 3 seconds) is equal to or more than the threshold value (for example, 80%), it is determined that "stability is provided", and a position of the predetermined range in the image may be recognized as the attention position.

<Example of Stability Determination of Image>

In the present specification, the fact that the image is "stable" means that "the image is stable in time series". In other words, in a case where there is no movement of an element (for example, a subject image) in the image for a predetermined time, or the movement of the element in the image for a predetermined time is small (equal to or less than the threshold value), it may be considered that "the image is stable". Here, the "predetermined time" and the "threshold value" are not limited to the case where they are fixed, but may be variable set values. As an image stability determining function, the image analyzing unit 24 determines whether or not the image is stable in time series. Hereinafter, an example of determination by the image analyzing unit 24 will be described. In the aspects of the present invention, this function is not mandatory, but may be implemented as an option.

As a first determination aspect of stability of the image, there is an aspect in which, a movement vector in the image is detected, a magnitude of the movement vector is integrated over a predetermined time, and in a case where an integral value is equal to or less than a threshold value, it is determined that "stability is provided". Here, the "predetermined time" and the "threshold value" are not limited to the case where they are fixed, but may be variable set values. According to this aspect, it may be determined whether or not the image is stable as a whole.

As a second determination aspect of stability of the image, there is an aspect in which, a candidate of an attention portion in an image (for example, a subject image) is detected by image processing and the stability of the image is determined based on the movement amount of each candidate in time series. In this aspect, it is possible to determine the image stability only for a portion (for example, a subject image), to which attention is highly likely to be paid by the user, in the image.

The determination aspect of the stability of the image is not limited to the first determination aspect and the second determination aspect described above. For example, there is also an aspect in which, the stability is determined only for a predetermined range (for example, a central portion of the image) which is important in the image. Here, the "predetermined range" is not limited to a case where it is fixed, but may be a variable set range.

<Attention Portion Estimating Function>

The image analyzing unit 24 has a function of calculating the feature amount of each portion in the image as information required for estimating an attention portion in the image. Here, "each portion in the image" may be a "subject image" in the image obtained by imaging the subject by imaging, and may be an element configuring the image in the non-imaging image. In the embodiments of the present invention, this function is not mandatory, but may be implemented as an option. Hereinafter, "each portion in the image" is also referred to as a "target" (object).

The estimation of the attention portion may be performed by using a result of known saliency calculation. The image analyzing unit 24 generates, for example, a saliency map. The saliency in this example refers to a degree to which each portion (target) in the image, acquired by the image acquiring unit 14 visually draws attention from the user. For example, the image analyzing unit 24 calculates a plurality of types of local feature amounts such as the brightness and the color of each portion in the image, and weights those feature amounts to calculate the saliency. The feature amounts calculated from the image are not particularly limited to the brightness and the color. However, it is not preferable to calculate every feature amount of every portion in the image because it increases a processing load. It is preferable to limit a region for saliency calculation in the image based on the result of the gaze analysis of the gaze analyzing unit 22. Furthermore, it is preferable to limit the types of feature amounts to be calculated as saliency parameters depending on the conditions such as an image scene and a type of the attention portion.

The estimation of the attention portion in an embodiment of the present invention is not particularly limited to a case where the result of the saliency calculation is used. For example, a result of the detection of a predetermined type of a subject image (for example, a face image) may be used.

<Example of Attention Position Recognition>

A specific example of attention position recognition by the attention position recognizing unit 26 will be described.

Figure 3:
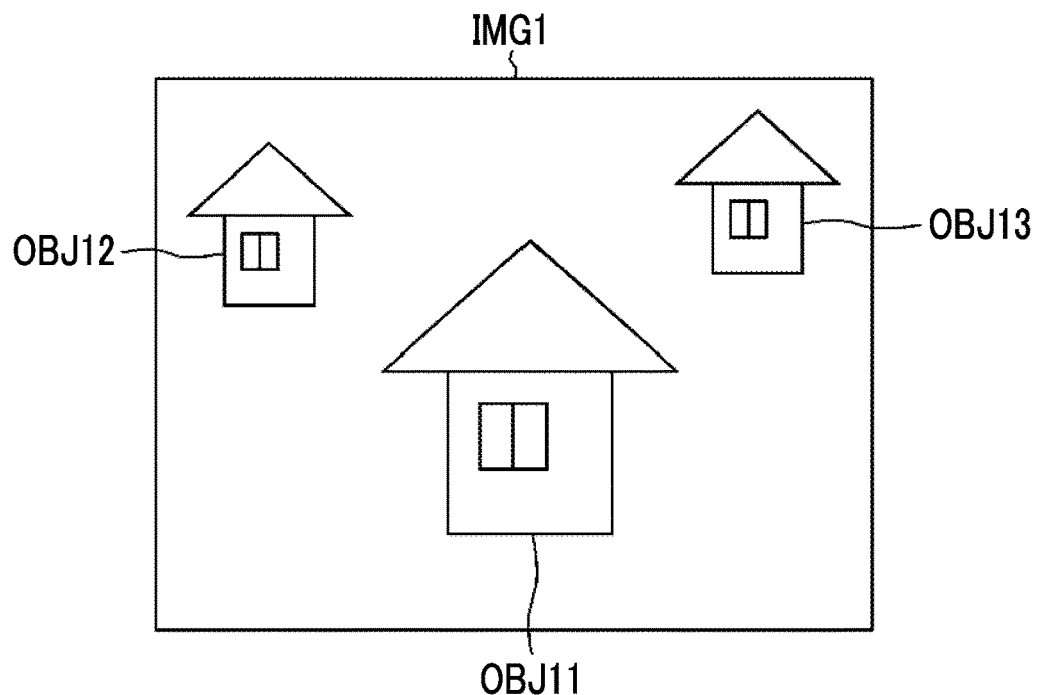
FIG. 3 is a diagram showing an example of an image of a still subject.

First, there will be described a case where the user pays attention to a still subject. It is considered that an image IMG1 shown in FIG. 3 is acquired and that the image IMG1 includes three still subject images OBJ11, OBJ12, and OBJ13. Only one frame in the motion picture is shown as the image IMG1.

Figure 4:
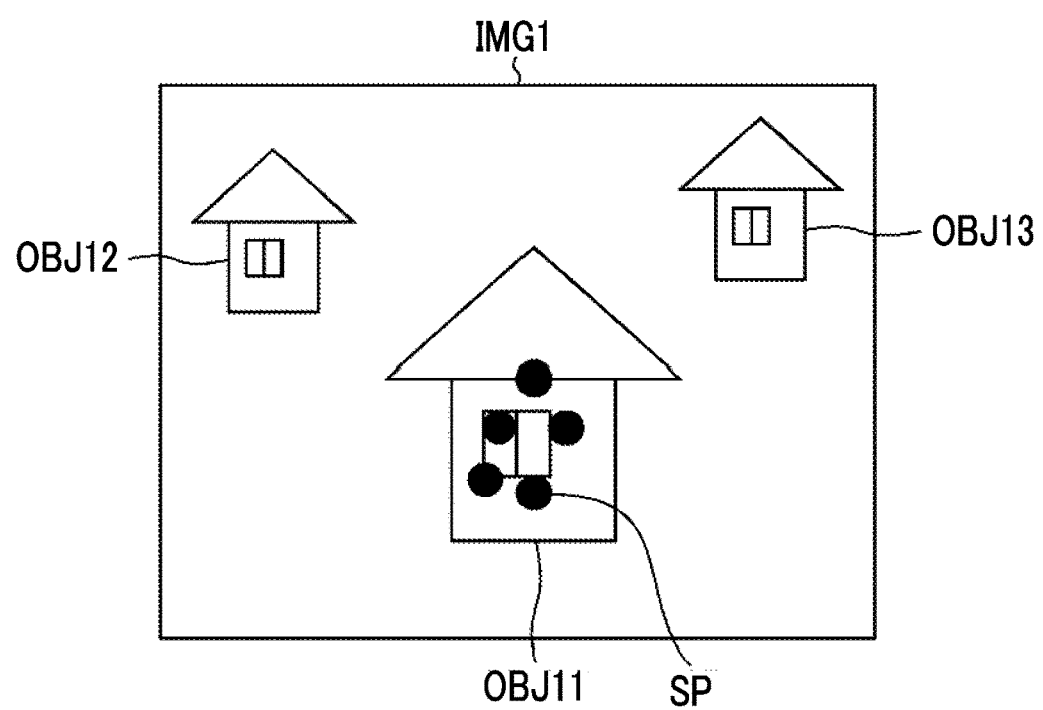
FIG. 4 is a diagram showing an example of a result of the detection of a first gaze position in the example of the image in FIG. 3.

FIG. 4 is a diagram showing the example of the result of the detection of a first gaze position in the image IMG1 of FIG. 3, and black dots in the figure indicate the gaze position SP. In this way, in a case where the distribution of gaze position SP in time series is concentrated within the range of one subject image OBJ11, it may be determined by the gaze analyzing unit 22 that the gaze position is stable. Since the gaze position is stable, the attention position recognizing unit 26 may recognize that the subject image OBJ11 is a portion, to which attention is paid by the user, in the image IMG1, based on the result of the detection of the gaze position of the gaze analyzing unit 22.

Figure 5:
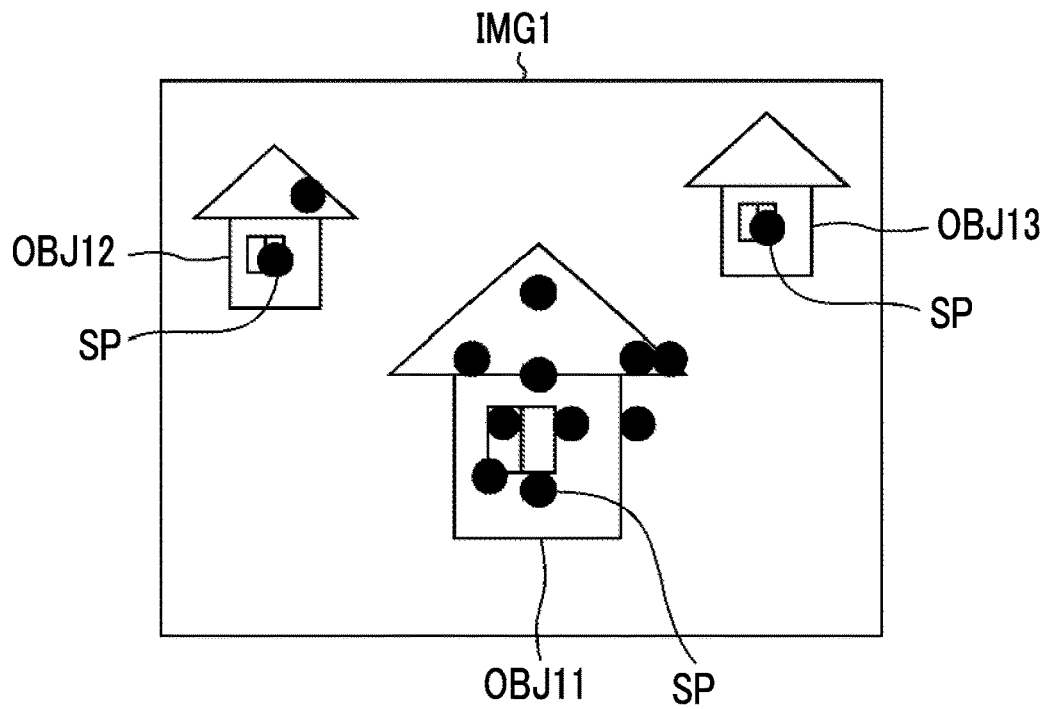
FIG. 5 is a diagram showing an example of a result of the detection of a second gaze position in the example of the image in FIG. 3.

FIG. 5 is a diagram showing the example of the result of the detection of a second gaze position in the image IMG1 of FIG. 3, and black dots in the figure indicate the gaze position SP. In a case where the integral value of the absolute value of the variation amount of the gaze position SP in a certain time period is large, it is determined by the gaze analyzing unit 22 that the gaze position is unstable. On the other hand, since the subject images OBJ11, OBJ12 and OBJ13 remain still in the image IMG1, it is determined by the image analyzing unit 24 that the image is stable. In such a case, the attention position recognizing unit 26 does not adopt the detected gaze position as it is as the attention position, but may recognize the attention position based on both the result of the gaze analysis and the result of the image analysis.

Figure 6:
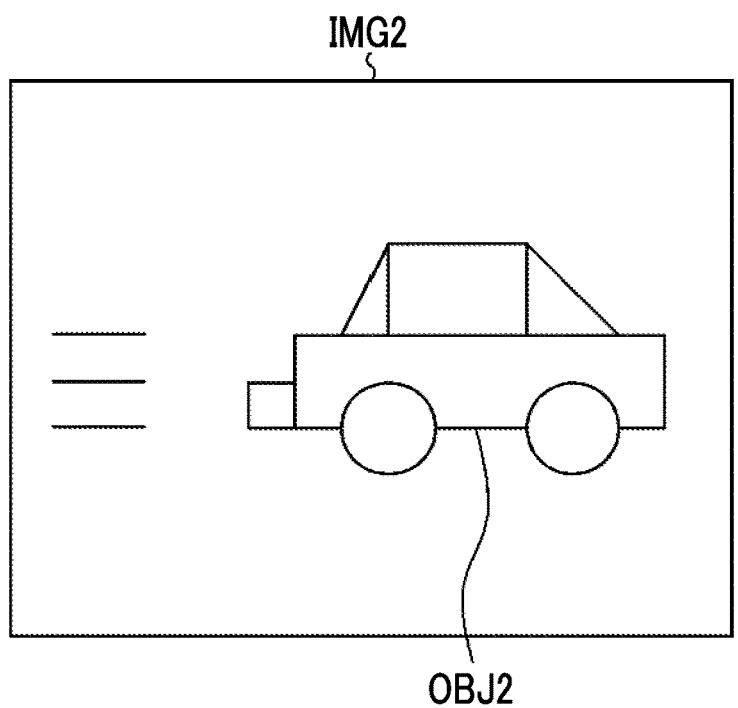
FIG. 6 is a diagram showing an example of an image of a moving subject.

Next, there will be described a case where the user pays attention to a moving subject. It is considered that an image IMG2 shown in FIG. 6 is acquired and that the image IMG2 includes a moving subject image OBJ2. The image IMG2 is a motion picture, and the subject image OBJ2 moves in the image IMG2.

Figure 7:
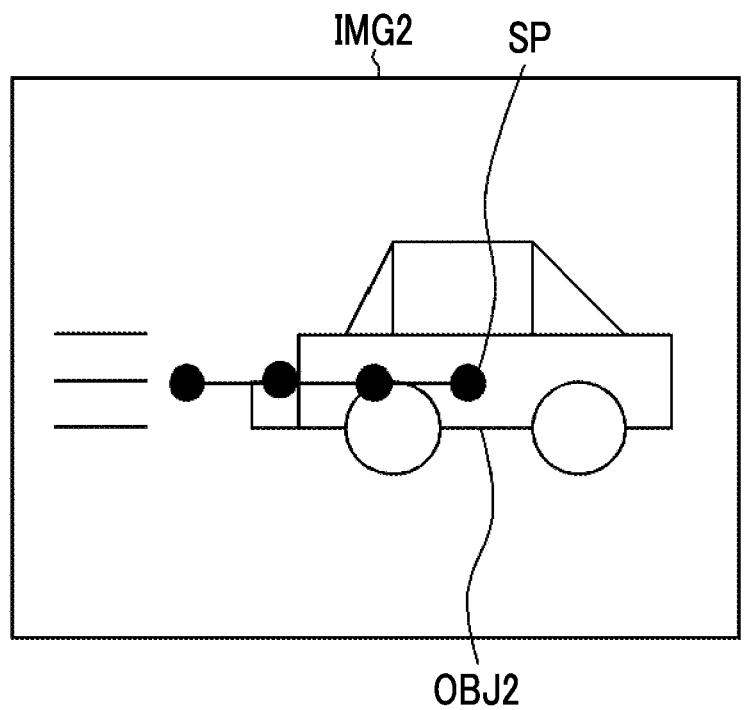
FIG. 7 is a diagram showing an example of a result of the detection of a gaze position in the example of the image of FIG. 6.
Figure 8:
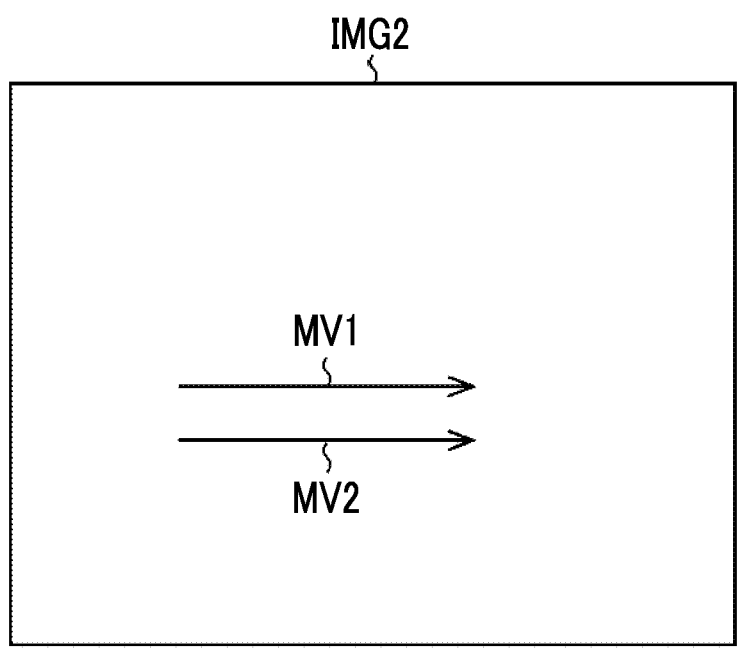
FIG. 8 is an explanatory diagram used for explaining a correlation between a movement of the gaze position and a movement in the image in the example of the image of FIG. 6.

FIG. 7 is an explanatory diagram showing the example of the result of the detection of the gaze position in the image IMG2 of FIG. 6, and black dots in the figure indicate the gaze position SP. It is determined by the gaze analyzing unit 22 that the gaze position is unstable. Since the subject image OBJ2 moves in the image IMG2, it may be determined by the image analyzing unit 24 that the image is unstable. In such a case, the attention position recognizing unit 26 determines the correlation between the movement of the gaze position SP in time series and the movement in the image IMG2 (in this example, the movement of the subject image OBJ2). FIG. 8 shows the movement vector MV1 of the gaze position SP and the movement vector MV2 in the image IMG2. The attention position recognizing unit 26 in this example compares the direction and the size between the two movement vectors MV1 and MV2 to determine a correlation between the movement of the gaze position and the movement in the image and in a case where it is determined that the correlation is provided, the detected gaze position is adopted as the attention position. A position (for example, a center position of the movement of the subject image OBJ2 in the image) calculated from the movement in the image may be adopted as the attention position. The operation unit 18 may be configured to accept an input of a selection instruction as to which one of the gaze position and the calculated position based on the image is to be selected as the attention position.

Figure 9:
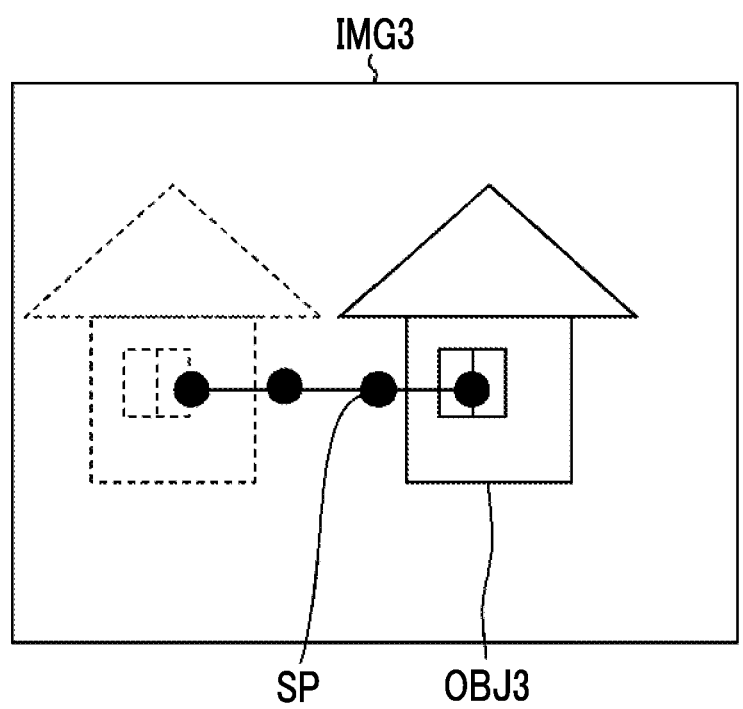
FIG. 9 is a diagram showing an example of an image of panning.

In a case where the still subject is imaged by panning, as shown in FIG. 9, a subject image OBJ3 moves in an image IMG3. In this case, it is determined by the gaze analyzing unit 22 that the gaze position is generally unstable, it is determined by the image analyzing unit 24 that the image is unstable, and it is determined by the attention position recognizing unit 26 that there is a correlation between the movement of the gaze position SP and the movement of the subject image OBJ3 in the image IMG3.

<Description of Flowchart>

Figure 10:
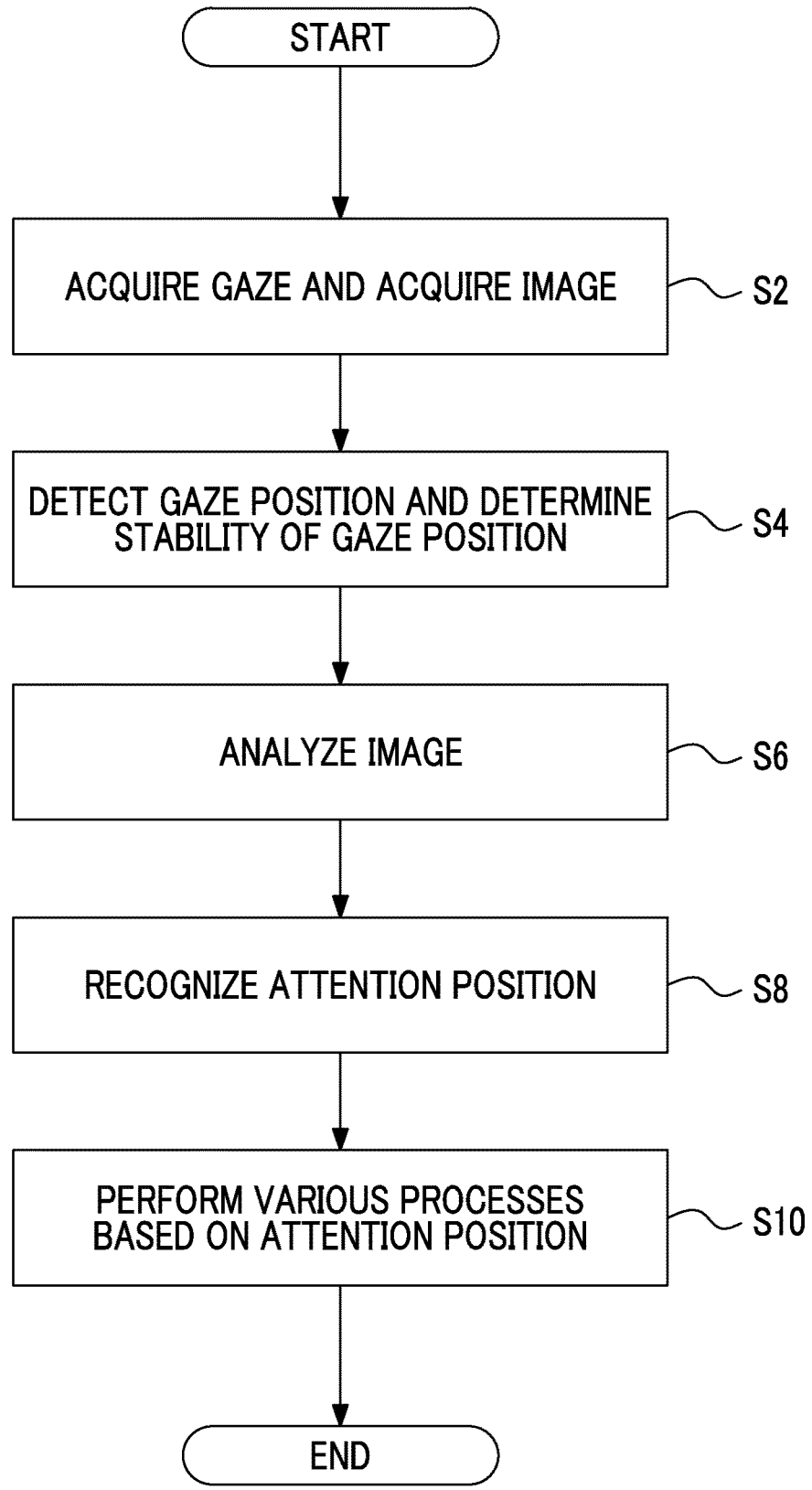
FIG. 10 is a flowchart showing a flow of basic processing to which the attention position recognizing method according to an embodiment of the invention is applied.

FIG. 10 is a flowchart showing a flow of basic processing to which the attention position recognizing method according to an embodiment of the invention is applied. This processing is executed in accordance with a program stored in the non-transitory storage device configuring the storage unit 30 in FIG. 1.

First, the gaze acquiring unit 12 acquires the gaze of the user (information indicating the movement of the eye of the user), and the image acquiring unit 14 acquires an image (step S2).

Next, the gaze analyzing unit 22 performs detection of the gaze position of the user and determination whether or not the detected gaze position is stable in time series (gaze position stability determining), as the gaze analysis of the user (step S4). The result of the gaze analysis is stored in the storage unit 30.

Next, the image analyzing unit 24 performs image analysis on the acquired image (step S6). The result of the image analysis is stored in the storage unit 30.

Next, based on both the result of the gaze analysis of the gaze analyzing unit 22 and the result of the image analysis of the image analyzing unit 24, the attention position recognizing unit 26 recognizes the attention position that is the position of the portion, to which attention is paid by the user, in the image (step S8). Hereinafter, step S8 will be referred to as an "attention position recognition step".

Next, various processes are performed based on the recognized attention position (step S10). Examples of various processes based on the attention position will be described later.

Figure 11:
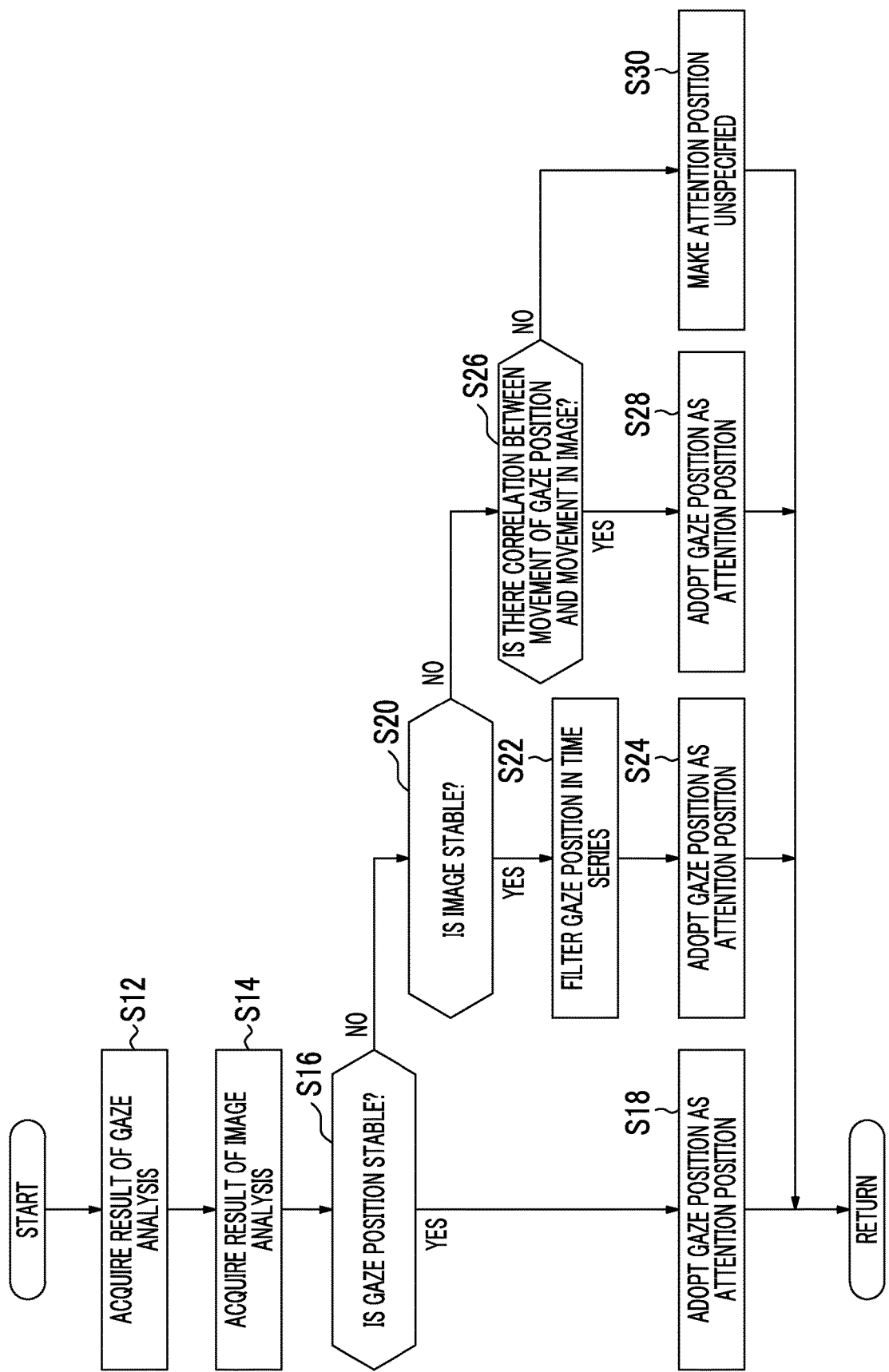
FIG. 11 is a flowchart showing a first example of an attention position recognition step.

FIG. 11 is a flowchart showing a first example of the attention position recognition step (step S8 in FIG. 10).

First, a result of the gaze analysis of the gaze analyzing unit 22 is acquired (step S12). In this example, information indicating the result of the detection of the gaze position and information indicating the result of the determination of the stability of the gaze position, generated by the gaze analyzing unit 22, are acquired from the storage unit 30.

Next, a result of the image analysis of the image analyzing unit 24 is acquired (step S14). In this example, information indicating the result of the determination of the stability of the image, generated by the image analyzing unit 24, is acquired from the storage unit 30.

Next, it is determined by the gaze analyzing unit 22 whether or not it is determined that the gaze position is stable in time series (step S16).

In a case where it is determined by the gaze analyzing unit 22 that the gaze position is stable in time series (in the case of "YES" in step S16), the attention position recognizing unit 26 adopts the gaze position detected by the gaze analyzing unit 22 as the attention position in the image (step S18).

In a case where it is determined by the gaze analyzing unit 22 that the gaze position is unstable in time series (in the case of "NO" in step S16), it is determined by the image analyzing unit 24 whether or not the image is stable in time series (step S20).

In a case where it is determined by the gaze analyzing unit 22 that the gaze position is unstable in time series and it is determined by the image analyzing unit 24 that the image is stable in time series (in the case of "YES" in step S20), the attention position recognizing unit 26 filters the gaze position detected by the gaze analyzing unit 22 in time series (step S22) and adopts the gaze position as the attention position (step S24). For example, a low pass filter may be used for the filtering.

In a case where it is determined by the gaze analyzing unit 22 that the gaze position is unstable in time series and it is determined by the image analyzing unit 24 that the image is unstable in time series (in the case of "NO" in step S20), the attention position recognizing unit 26 determines whether or not there is a correlation between the movement of the gaze position detected by the gaze analyzing unit 22 and the movement in the image detected by the image analyzing unit 24 (step S26). In other words, the attention position recognizing unit 26 compares the movement of the detected gaze position with the movement in the detected image to determine whether or not to adopt the detected gaze position as the attention position. In the case where the movement of the gaze position is similar to the movement in the image, for example, in a case where a difference (magnitude difference and direction difference) between the movement vector of the gaze position and the movement vector in the image is equal to or less than a threshold value, it is determined that "the correlation is provided". In a case where the difference exceeds the threshold value, it is determined that "no correlation is provided".

In a case where it is determined that there is a correlation between the movement of the gaze position and the movement in the image (in the case of "YES" in step S26), the attention position recognizing unit 26 adopts the detected gaze position as the attention position (step S28).

In a case where it is determined that there is no correlation between the movement of the gaze position and the movement in the image (in the case of "NO" in step S26), the attention position is made unspecified (step S30). In this example, the attention position is set to null.

Figure 12:
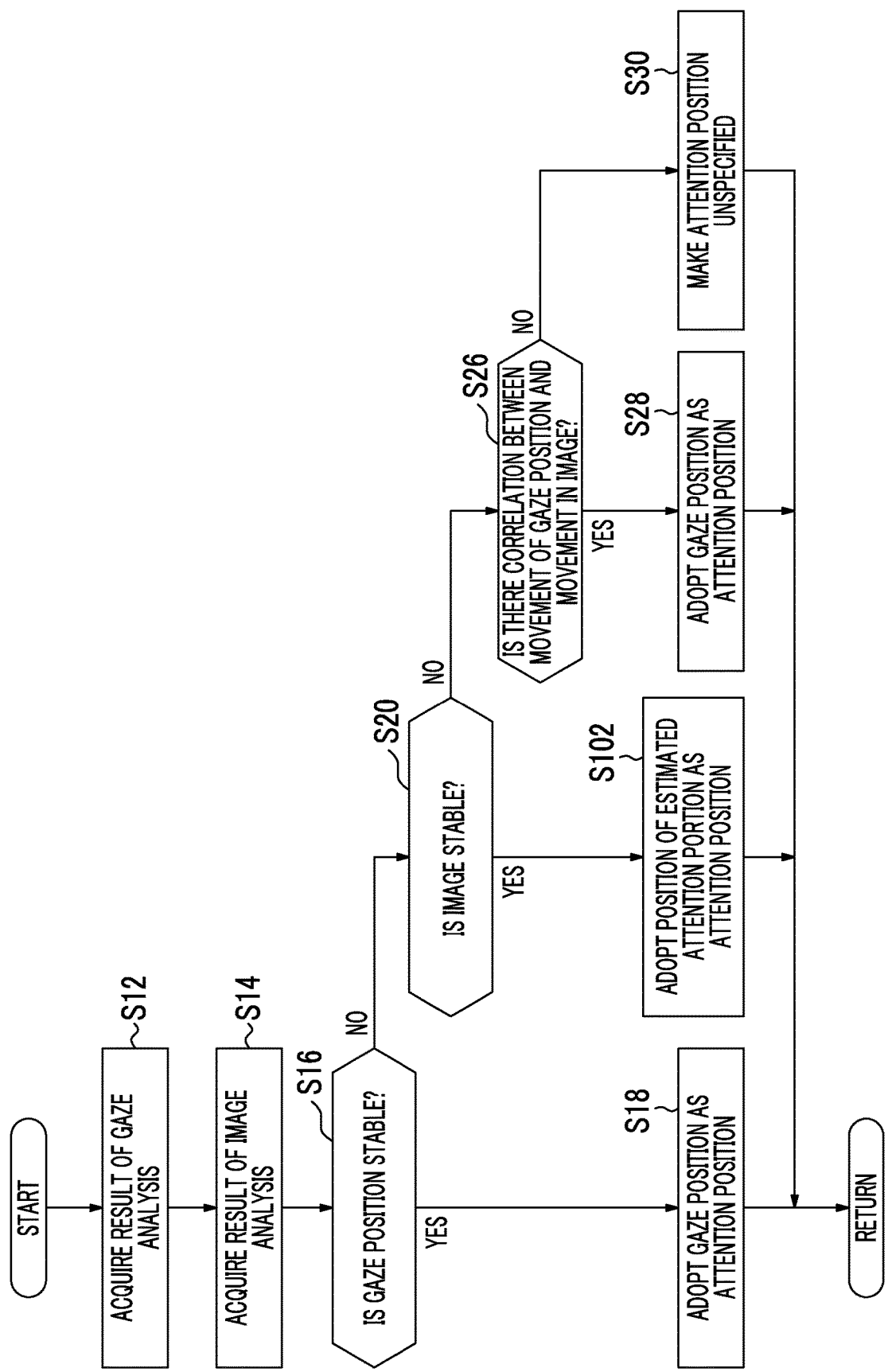
FIG. 12 is a flowchart showing a second example of an attention position recognition step.

FIG. 12 is a flowchart showing a second example of the attention position recognition step (step S8 in FIG. 10). The same steps as those of the first example shown in FIG. 11 are denoted by the same reference numerals, and contents that have been described above will be omitted from the following description.

Steps S12 to S20 and steps S26 to S30 are the same as those of the first example. However, in this example, in step S14 (image analysis result acquisition), information indicating the result of the saliency calculation, generated by the image analyzing unit 24, is acquired from the storage unit 30.

In a case where it is determined that the gaze position is unstable in time series and it is determined that the image is stable in time series (in the case of "YES" in step S20), the attention position recognizing unit 26 in this example estimates an attention portion in the image based on the result of image analysis, and adopts a position of the estimated attention portion in the image as an attention position (step S102). For example, in step S6 (image analysis) of FIG. 10, a saliency map indicating the saliency of each portion in the image is prepared by the image analyzing unit 24. The attention position recognizing unit 26 estimates a portion with the highest saliency in the image as the attention portion and adopts the position of the attention portion in the image as the attention position.

Figure 13:
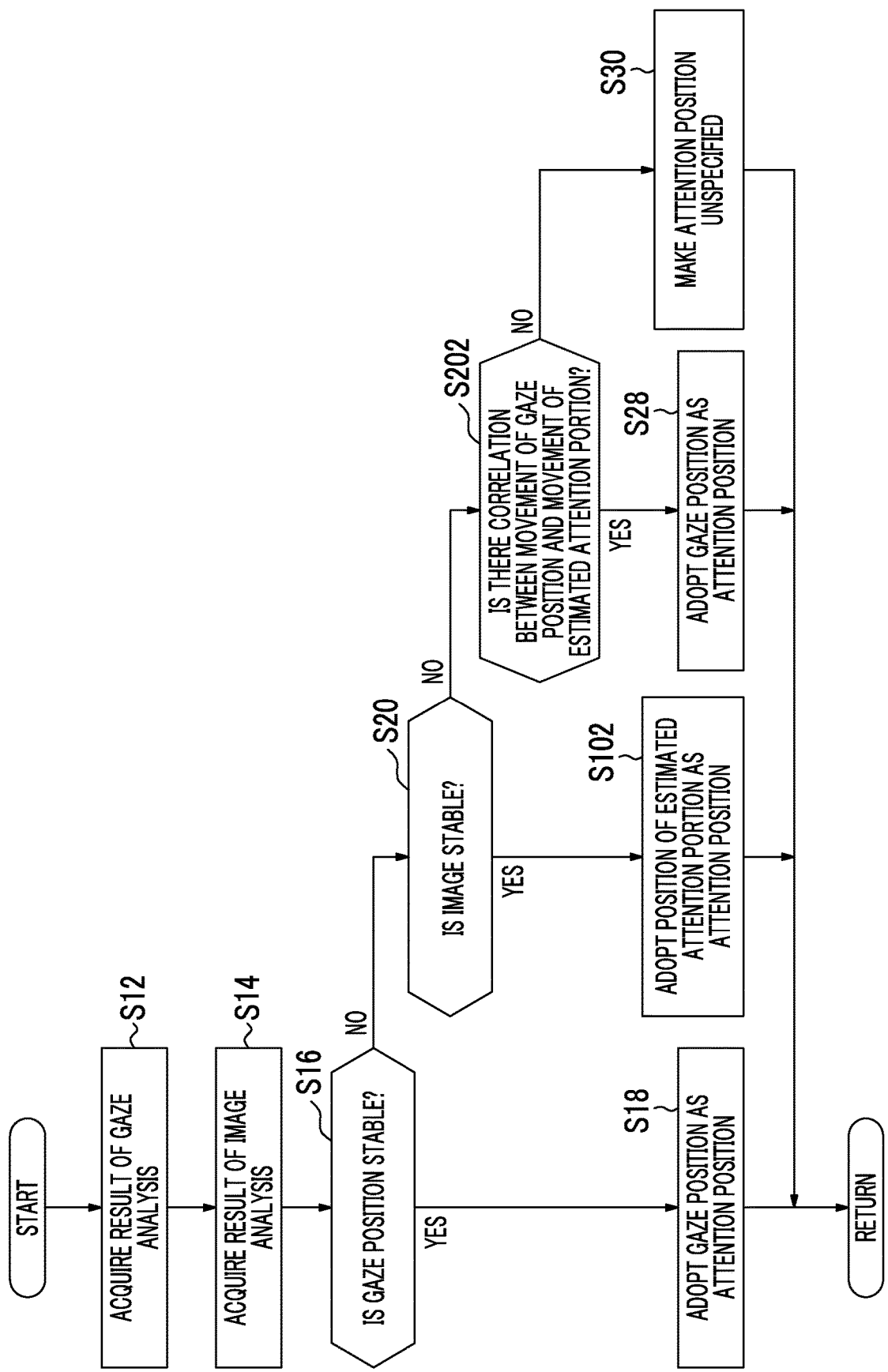
FIG. 13 is a flowchart showing a third example of an attention position recognition step.

FIG. 13 is a flowchart showing a third example of the attention position recognition step (step S8 in FIG. 10). The same steps as those of the second example shown in FIG. 12 are denoted by the same reference numerals, and contents that have been described above will be omitted from the following description.

Steps S12 to S20 and step S102 are the same as those of the second example. Also, in this example, in step S14 (image analysis result acquisition), information indicating the result of the saliency calculation, generated by the image analyzing unit 24, is acquired from the storage unit 30.

In a case where it is determined that the gaze position is unstable in time series and it is determined that the image is unstable in time series (in the case of "NO" in step S20), the attention position recognizing unit 26 in this example estimates an attention portion in the image based on the result of image analysis, and determines whether or not there is a correlation between the movement of the gaze position detected by the gaze analyzing unit 22 and the movement of the estimated attention portion in the image (step S202). For example, in step S6 (image analysis) of FIG. 10, a saliency map indicating the saliency of each portion in the image is prepared by the image analyzing unit 24. The attention position recognizing unit 26 estimates a portion with the highest saliency in the image as the attention portion, and compares the movement of the estimated attention portion with the movement of the detected gaze position to determine whether or not to adopt the gaze position as the attention position. In the case where the movement of the gaze position is similar to the movement of the attention portion, for example, in a case where a difference (a difference of magnitude and a difference of direction) between the movement vector of the gaze position and the movement vector of the attention portion in the image is equal to or less than a threshold value, it is determined that "the correlation is provided". In a case where the difference exceeds the threshold value, it is determined that "no correlation is provided".

In a case where it is determined that there is a correlation between the movement of the gaze position and the movement of the attention portion (in the case of "YES" in step S202), the attention position recognizing unit 26 adopts the detected gaze position as an attention position (step S28). In a case where it is determined that there is no correlation between the movement of the gaze position and the movement of the attention portion (in the case of "NO" in step S202), the attention position is made unspecified (step S30).

Figure 14:
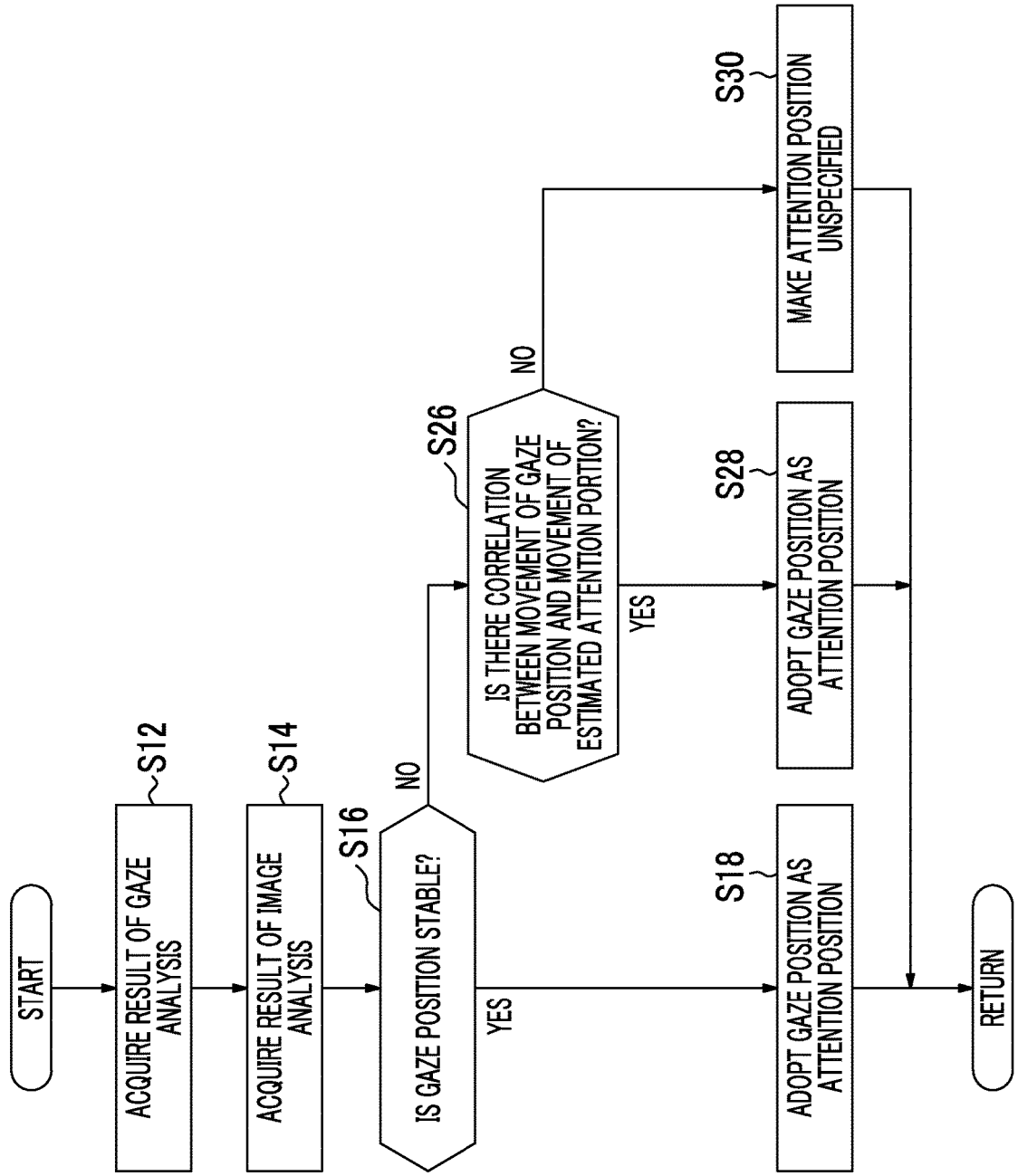
FIG. 14 is a flowchart showing a fourth example of an attention position recognition step.

FIG. 14 is a flowchart showing a fourth example of the attention position recognition step (step S8 in FIG. 10). The same steps as those of the first example shown in FIG. 11 are denoted by the same reference numerals, and contents that have been described above will be omitted from the following description.

Steps S12 to S18 are the same as those of the first example.

In a case where it is determined that the gaze position is unstable in time series (in the case of "NO" in step S16), the attention position recognizing unit 26 in this example determines whether or not there is a correlation between the movement of the gaze position detected by the gaze analyzing unit 22 and the movement in the image detected by the image analyzing unit 24 (step S26). This step S26 and steps S28 and S30 are the same as those of the first example.

Figure 15:
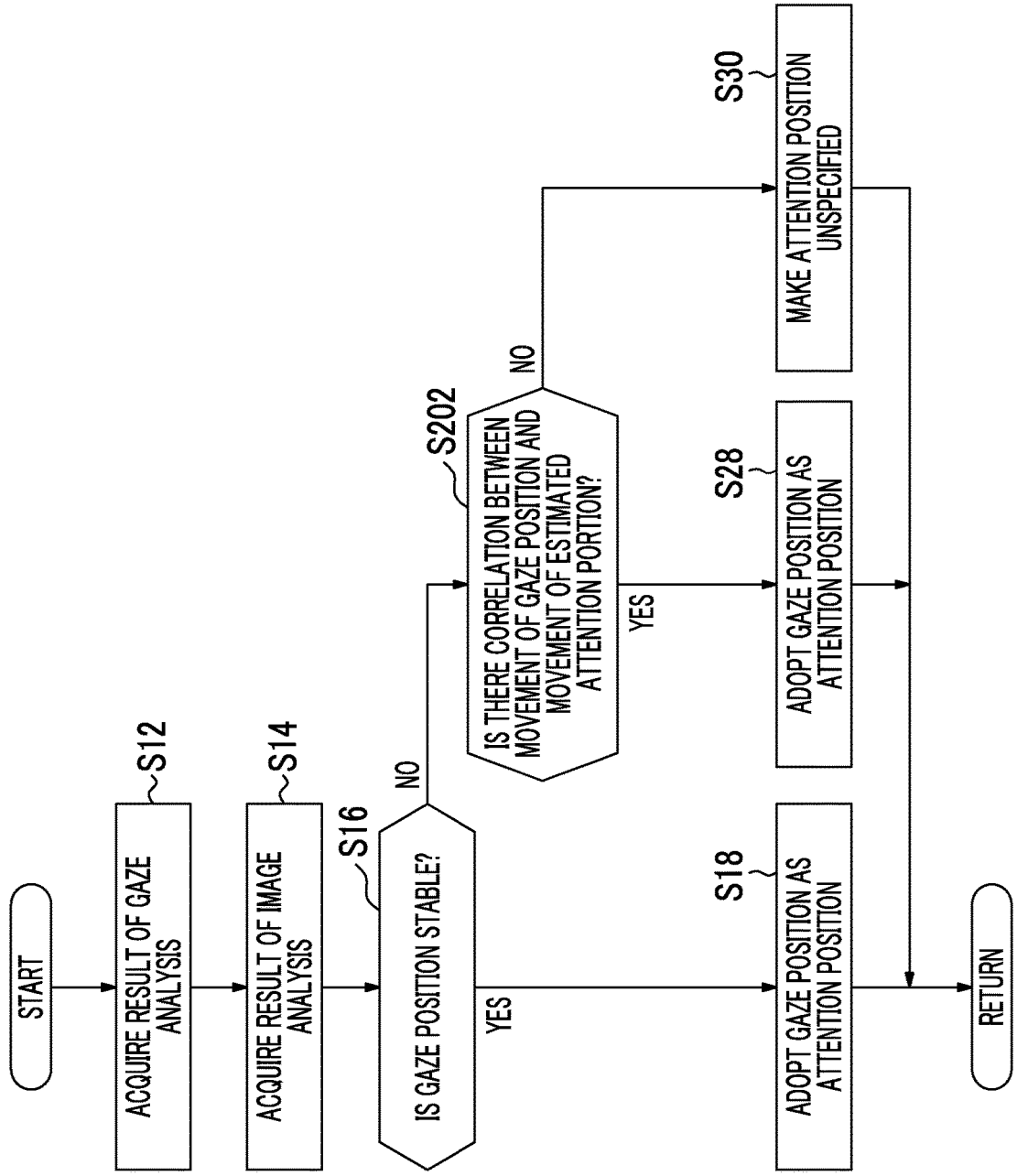
FIG. 15 is a flowchart showing a fifth example of an attention position recognition step.

FIG. 15 is a flowchart showing a fifth example of the attention position recognition step (step S8 in FIG. 10). The same steps as those of the third example shown in FIG. 13 are denoted by the same reference numerals, and contents that have been described above will be omitted from the following description.

Steps S12 to S18 are the same as those of the third example.

In a case where it is determined that the gaze position is unstable in time series (in the case of "NO" in step S16), the attention position recognizing unit 26 in this example estimates an attention portion in the image based on the result of image analysis, and determines whether or not there is a correlation between the movement of the gaze position detected by the gaze analyzing unit 22 and the movement of the estimated attention portion in the image (step S202). This step S202 and steps S28 and S30 are the same as those of the third example.

In the embodiments of the present invention, the attention position recognizing unit 26 is not limited to cases where the aforementioned examples 1 to 5 are performed. For example, in a case where it is determined that the gaze position is stable, the attention position recognizing unit 26 may be configured to increase a weight of the result of gaze analysis to be larger than a case where it is determined that the gaze position is unstable, to recognize the attention position.

<Configuration Example of Image Pickup Apparatus>

Figure 16:
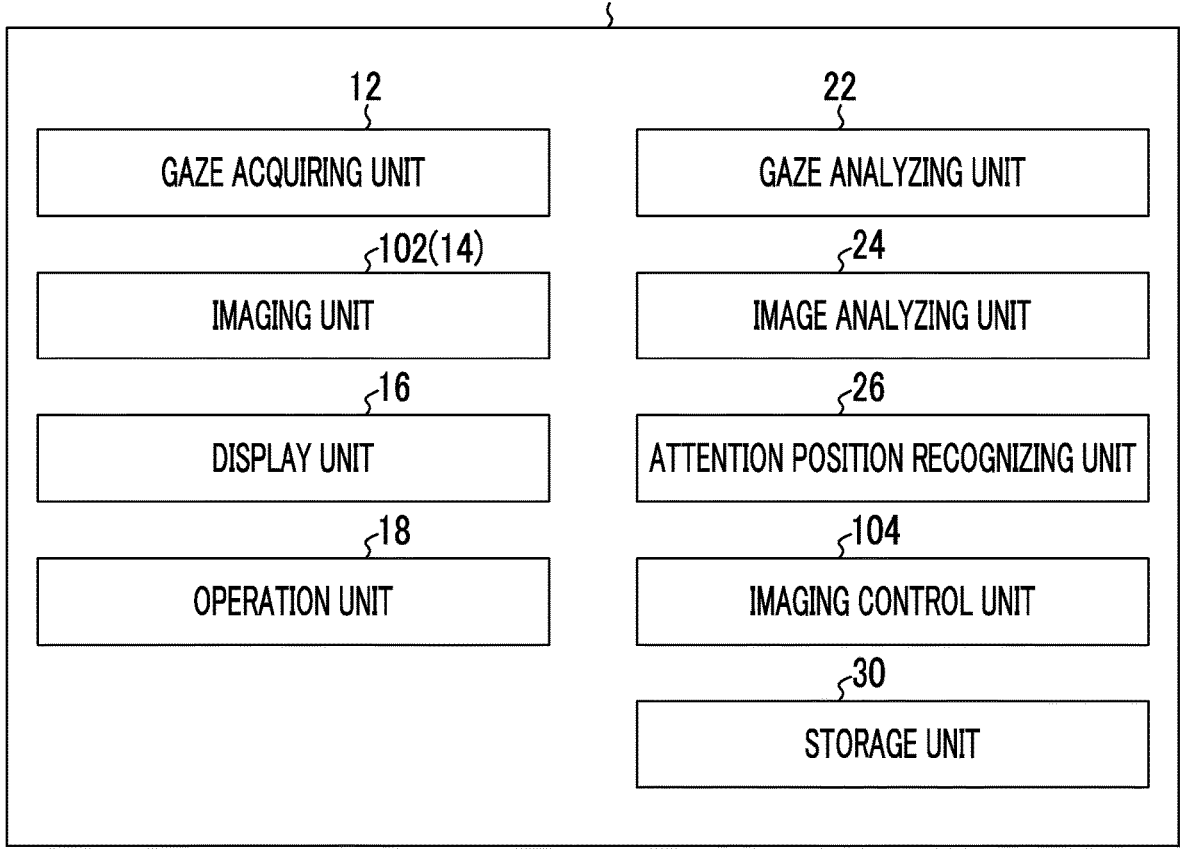
FIG. 16 is a block diagram showing a configuration example of an image pickup apparatus to which an embodiment of the present invention is applied.

FIG. 16 is a block diagram showing a configuration example of an image pickup apparatus to which the attention position recognizing apparatus according to an embodiment of the invention is applied. The same components as those of the attention position recognizing apparatus 10 shown in FIG. 1 are denoted by the same reference numerals, and contents that have been described above will be omitted from the following description.

The image pickup apparatus 100 in this example is configured by including an imaging unit 102 that images a subject and an imaging control unit 104 that controls the imaging unit 102. The imaging unit 102 includes an imaging element and an imaging optical system that forms a subject image on the imaging element. The imaging unit 102 may be configured with, for example, the main unit of a digital camera. The imaging unit 102 may be used as the image acquiring unit 14 in FIG. 1.

The imaging control unit 104 performs at least one of automatic focus adjustment, automatic exposure, or automatic color balance correction (for example, automatic white balance correction) using the attention position recognized by the attention position recognizing unit 26. For example, a detection region of focus detection is determined based on the recognized attention position, and automatic focus detection is performed.

The image analyzing unit 24 in this example performs image analysis on an image obtained by imaging by the imaging unit 102.

The gaze acquiring unit 12 in this example is provided on a rear side (a side facing the face of the user) which is the opposite side to a front side (a side facing the subject) of the image pickup apparatus 100. A finder may be provided in the image pickup apparatus 100, and the gaze acquiring unit 12 may be provided in the finder.

<Configuration Example of Smartphone>

Figure 17:
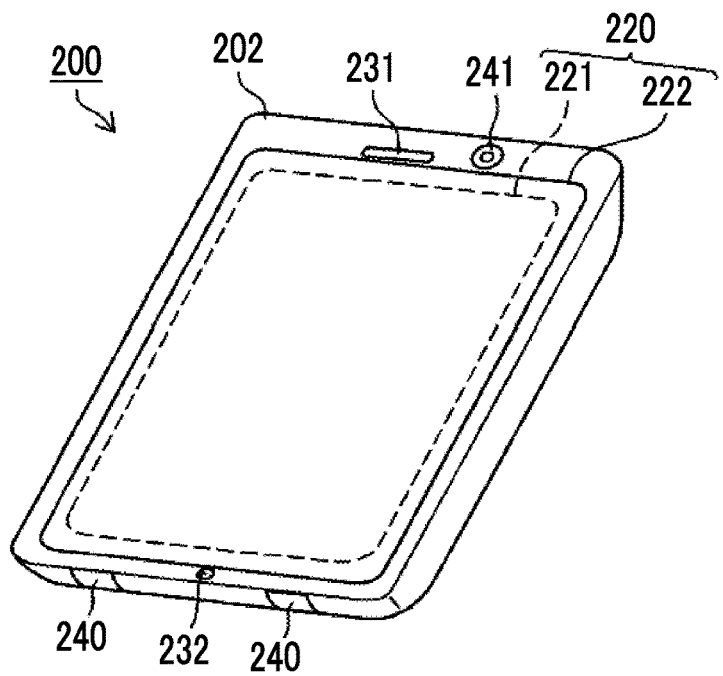
FIG. 17 is a perspective view showing an appearance of a smartphone to which an embodiment of the present invention is applied.

FIG. 17 is an external view of an example of a smartphone to which the attention position recognizing apparatus according to an embodiment of the invention is applied. A smartphone 200 shown in FIG. 17 has a housing 202 that has a flat plate shape, and includes a display input unit 220 in which a display panel 221 and an operation panel 222 are integrated on one surface of a housing 202. The housing 202 comprises a speaker 231, a microphone 232, an operation unit 240, and a camera unit 241. The configuration of the housing 202 is not limited to this. For example, it is possible to adopt a configuration in which the display unit and the input unit are independent, or it is possible to adopt a configuration having a slide mechanism or a folded structure.

Figure 18:
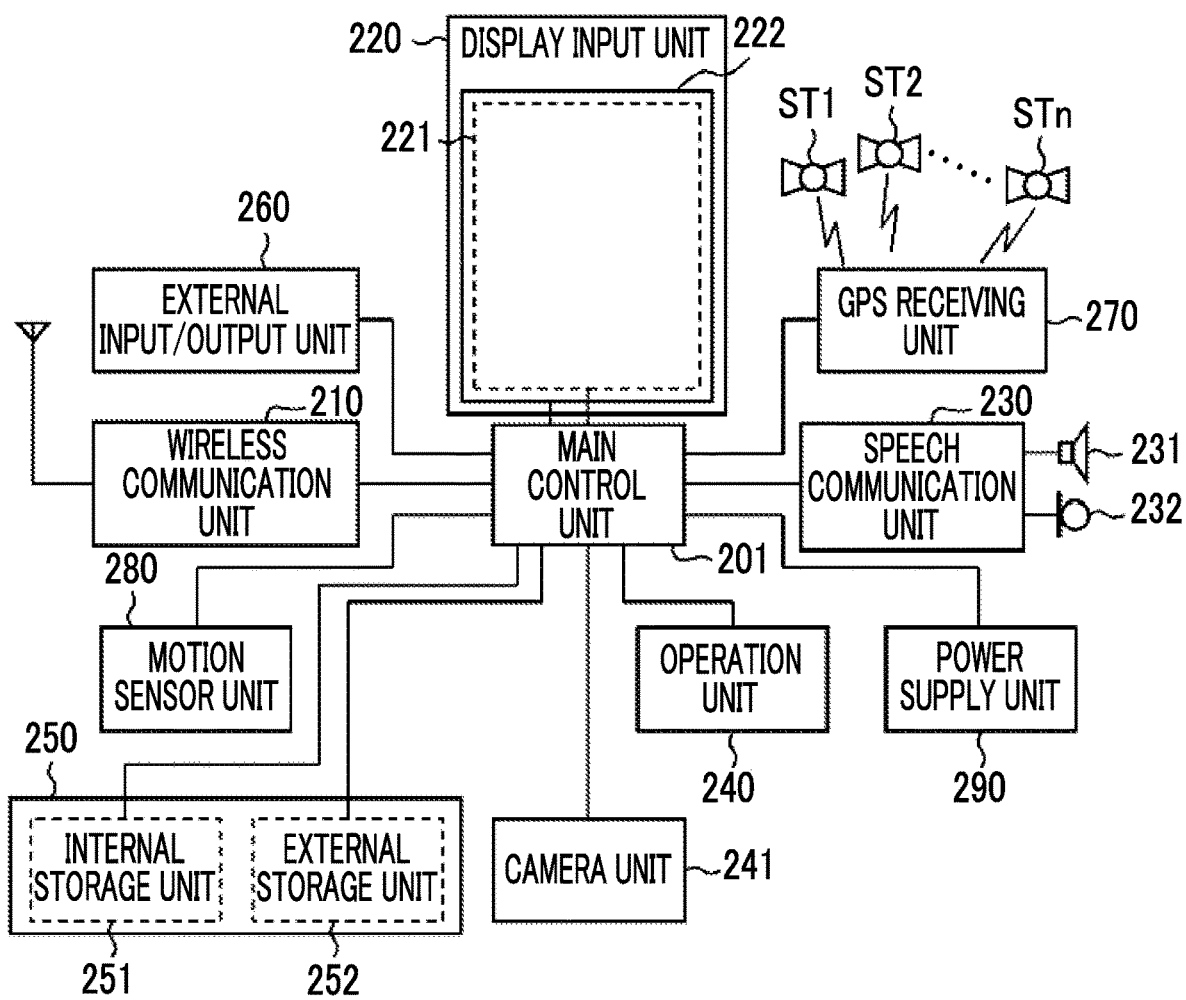
FIG. 18 is a block diagram showing a configuration example of a smartphone to which an embodiment of the present invention is applied.

FIG. 18 is a block diagram showing a configuration example of the smartphone 200 shown in FIG. 17 As shown in FIG. 18, the smartphone comprises, as main components, a wireless communication unit 210, a display input unit 220, a speech communication unit 230, an operation unit 240, a camera unit 241, a storage unit 250, an external input/output unit 260, a global positioning system (GPS) receiving unit 270, a motion sensor unit 280, a power supply unit 290, and a main control unit 201. As the main function of the smartphone 200, there is provided a wireless communication function of performing mobile wireless communication through a base station apparatus and a mobile communication network.

The wireless communication unit 210 performs wireless communication with the base station apparatus, which is included in the mobile communication network in accordance with an instruction of the main control unit 201. Using such wireless communication, various types of file data such as audio data and image data, e-mail data and the like are transmitted and received, and Web data, streaming data, and the like are received.

The display input unit 220 is a so-called touch panel, and includes a display panel 221 and an operation panel 222. The touch panel displays image (still image and motion image) information, text information, or the like so as to visually transfer the information to the user in accordance with the control of the main control unit 201, and detects a user operation on the displayed information.

The display panel 221 uses a liquid crystal display (LCD), an organic light emitting diodes (OLED) display or the like as a display device. The operation panel 222 is a device that is provided for viewing an image which is displayed on the display surface of the display panel 221 and that detects one or a plurality of coordinates at which an operation is performed by a finger of the user or a pen-type input apparatus. In a case where such a device is operated by the finger of the user or the pen-type input apparatus, the device outputs a detection signal, which is generated due to this operation, to the main control unit 201. Subsequently, the main control unit 201 detects an operation position (coordinates) on the display panel 221 based on the received detection signal.

As shown in FIG. 17, the display panel 221 and the operation panel 222 of the smartphone 200 are integrated to configure the display input unit 220, but are placed such that the operation panel 222 entirely covers the display panel 221. In a case where this placement is adopted, the operation panel 222 may have a function of also detecting a user operation in a region other than the display panel 221. In other words, the operation panel 222 may include a detection region (hereinafter, referred to as a display region) for an overlapping portion which overlaps with the display panel 221 and a detection region (hereinafter, referred to as a non-display region) for the other portion at the outer edge which does not overlap with the display panel 221.

The size of the display region and the size of the display panel 221 may be entirely matched, but it is not always necessary to match the size of the display region and the size of the display panel 221. The operation panel 222 may include two sensitive regions of an outer edge portion and the other inside portion. Furthermore, the width of the outer edge portion is appropriately designed depending on a size of the housing 202 or the like. Furthermore, as a position detection method adopted for the operation panel 222, a matrix switch method, a resistance film method, a surface acoustic wave method, an infrared method, an electromagnetic induction method, an electrostatic capacitance method, and the like may be mentioned, and any method thereof may be adopted.

The speech communication unit 230 includes a speaker 231 and a microphone 232, and converts the audio of the user input through the microphone 232, into audio data that may be processed by the main control unit 201 to output the audio data to the main control unit 201, or the external input/output unit 260, and decodes audio data received by the wireless communication unit 210 or the external input/output unit 260 to output the decoded audio voice to the speaker 231". As shown in FIG. 17, for example, the speaker 231 may be mounted on the same surface as the surface on which the display input unit 220 is provided, and the microphone 232 may be mounted on the side surface of the housing 202.

The operation unit 240 is a hardware key using a key switch or the like and accepts an instruction from the user. For example, as shown in FIG. 17, the operation unit 240 is a push button-type switch that is mounted on the side surface of the housing 202 of the smartphone 200, is turned on in a case of being depressed by a finger or the like, and is turned off by a force of restitution such as a spring in a case where the finger moves away.

The storage unit 250 stores a control program and control data of the main control unit 201, application software, address data associated with a name and telephone number of a communication partner, transmitted/received e-mail data, Web data downloaded by Web browsing and downloaded contents data, and temporarily stores streaming data and the like. The storage unit 250 is configured with an internal storage unit 251 built in the smartphone, and an external storage unit 252 having an external memory slot for attachable or detachable external memory. Each of the internal storage unit 251 and the external storage unit 252 configuring the storage unit 250 may be implemented by using a storage medium (a computer readable non-transitory tangible medium) such as a flash memory type, a hard disk type, a multimedia card micro type, a card type memory (for example, MicroSD (registered trademark) memory, and the like), random access memory (RAM), and a read-only memory (ROM).

The external input/output unit 260 has a function of an interface with all external equipment connected to the smartphone 200, and is for communication with other external equipment (such as universal serial bus (USB)), or for direct or indirect connection to networks (such as the Internet, wireless local area network (LAN), Bluetooth (registered trademark), radio frequency identification (RFID), infrared communication (infrared data association: IrDA) (registered trademark), ultra wide band (UWB) (registered trademark), and ZigBee (registered trademark), or the like)

Examples of the external equipment connected to the smartphone 200 include a wired/wireless headset, a wired/wireless external charger, a wired/wireless data port, a memory card which is connected through a card socket, a subscriber identity module (SIM)/user identity module (UIM) card, external audio and video equipment which are connected through audio and video input/output (I/O) terminals, external audio and video equipment which are connected in a wireless manner, a smartphone which is connected in a wired or wireless manner, a personal computer which is connected in a wired or wireless manner, a personal digital assistant (PDA) which is connected in a wired or wireless manner, an earphone, and the like. The external input/output unit may transfer data, which is transmitted from such external equipment, to each of the components within the smartphone 200, or may allow data within the smartphone 200 to be transmitted to the external equipment.

A GPS receiving unit 270 receives GPS signals, which are transmitted from GPS satellites ST1 to STn in accordance with instructions of the main control unit 201, executes positioning calculation processing based on the received plurality of GPS signals, and detects a position including a latitude, a longitude, and an altitude of the smartphone 200. In a case where position information may be acquired from the wireless communication unit 210 or the external input/output unit 260 (for example, wireless LAN), the GPS receiving unit 270 may detect the position using the position information.

The motion sensor unit 280 includes, for example, a triaxial acceleration sensor and the like, and detects physical movement of the smartphone 200 in accordance with an instruction of the main control unit 201. By detecting the physical movement of the smartphone 200, an acceleration and a direction of the movement of the smartphone 200 are detected. Such a detection result is output to the main control unit 201.

The power supply unit 290 supplies each unit of the smartphone 200 with electric power, which is stored in a battery (not shown), in accordance with an instruction of the main control unit 201.

The main control unit 201 includes a microprocessor, and operates in accordance with a control program and control data stored in the storage unit 250 to integrally control each unit of the smartphone 200. The main control unit 201 has an application processing function and a mobile communication control function of controlling each unit of the communication system in order to perform data communication and audio communication through the wireless communication unit 210.

The application processing function is implemented by an operation of the main control unit 201 in accordance with the application software stored in the storage unit 250. Examples of the application processing function include an infrared communication function of controlling the external input/output unit 260 to perform data communication with counter equipment, an e-mail function of transmitting and receiving e-mails, a web browsing function of browsing web pages, and the like.

The main control unit 201 has an image processing function of displaying an image on the display input unit 220 and the like, based on image data (data of a still image or a motion image) such as received data or downloaded streaming data. The image processing function means a function of causing the main control unit 201 to decode the image data, perform image processing on the decoding result, and display an image on the display input unit 220.

Furthermore, the main control unit 201 executes display control for the display panel 221 and operation detection control to detect a user operation through the operation unit 240 and the operation panel 222.

Through execution of the display control, the main control unit 201 displays an icon for activating application software, and a window for displaying a software key such as a scroll bar, or preparing an e-mail. With respect to an image or the like which is too large to fit in the display region of the display panel 221, the scroll bar means a software key for accepting an instruction to move a display portion of the image.

Through execution of the operation detection control, the main control unit 201 detects a user operation through the operation unit 240, accepts an operation performed on the icon or an input of a text string performed in an input field of the window through the operation panel 222, or accepts a request to scroll a displayed image through the scroll bar.

Furthermore, the main control unit 201 has a touch panel control function performed through execution of the operation detection control. The function determines whether the operation position on the operation panel 222 is in the overlapping portion (display region) which overlaps with the display panel 221 or the other portion (non-display region) at the outer edge which does not overlap with the display panel 221, and controls the display position of the software key or the sensitive region of the operation panel 222.

The main control unit 201 may detect a gesture operation performed on the operation panel 222, and may execute a preset function in response to the detected gesture operation. The gesture operation is not a simple touch operation used in the past. The gesture operation means an operation of drawing a locus with a finger or the like, an operation for specifying a plurality of positions at the same time, or an operation of drawing loci from a plurality of positions to at least one position as a combination of the above-mentioned operations.

The camera unit 241 is a digital camera that performs electronic image pickup using an imaging element such as a complementary metal oxide semiconductor (CMOS) imaging sensor or a charge coupled device (CCD) imaging sensor. The camera unit 241 converts the image data obtained by the imaging into compressed image data, for example, a joint photographic coding experts group (JPEG) in accordance with control of the main control unit 201, and may record the image data in the storage unit 250 or output the image data through an external input/output unit 260 and the wireless communication unit 210. In the smartphone 200 shown in FIG. 17, although the camera unit 241 is mounted on the same surface as the display input unit 220, a mounting position of the camera unit 241 is not limited to this. The camera unit may be mounted on the back of the display input unit 220. Alternatively, a plurality of camera units 241 may be mounted. In a case where a plurality of camera units 241 are mounted, it is also possible to perform image pickup by independently switching the camera unit 241 to be used for image pickup, or perform image pickup by using a plurality of camera units 241 at the same time.

The comparison between the smartphone 200 in this example and the basic configuration example of the attention position recognizing apparatus 10 of FIG. 1 will be described. For example, the camera unit 241 may be used as the gaze acquiring unit 12, the wireless communication unit 210 may be used as the image acquiring unit 14, the display panel 221 may be used as the display unit 16, the operation panel 222 may be used as the operation unit 18, the main control unit 201 may be used as the gaze analyzing unit 22, the image analyzing unit 24, and the attention position recognizing unit 26, and the storage unit 250 may be used as the storage unit 30. The camera unit 241 may be configured with a first camera that causes the camera unit 241 to face a face of the user and a second camera that causes the camera unit 241 to face a subject in the field of view of the user, the first camera may be used as the gaze acquiring unit 12, and the second camera may be used as the image acquiring unit 14.

<Configuration Example of Display Apparatus>

Figure 19:
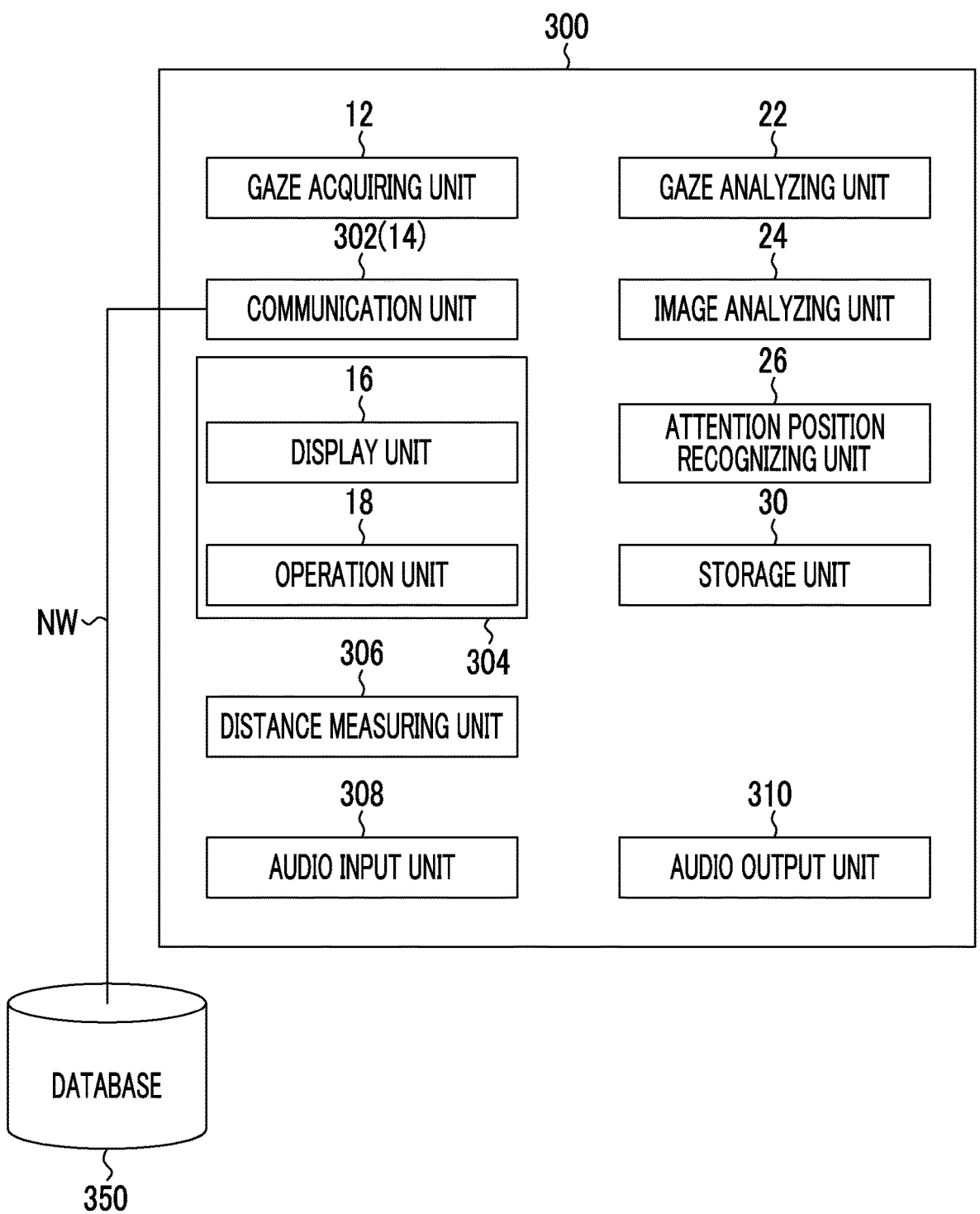
FIG. 19 is a block diagram showing a configuration example of a display apparatus to which an attention position recognizing apparatus of an embodiment of the present invention is applied.

FIG. 19 is a block diagram showing a configuration example of a display apparatus to which the attention position recognizing apparatus according to an embodiment of the invention is applied. The same components as those of the attention position recognizing apparatus 10 shown in FIG. 1 are denoted by the same reference numerals, and contents that have been described above will be omitted from the following description.

The display apparatus 300 in this example includes a communication unit 302 that acquires an image from database 350 by communication. The communication unit 302 may be configured with a communication device that performs communication with the database 350 through a network NW. The communication device may use a wired communication device or a wireless communication device. That is, the communication unit 302 acquires the image to be analyzed by the image analyzing unit 24 by communication.

Figure 20:
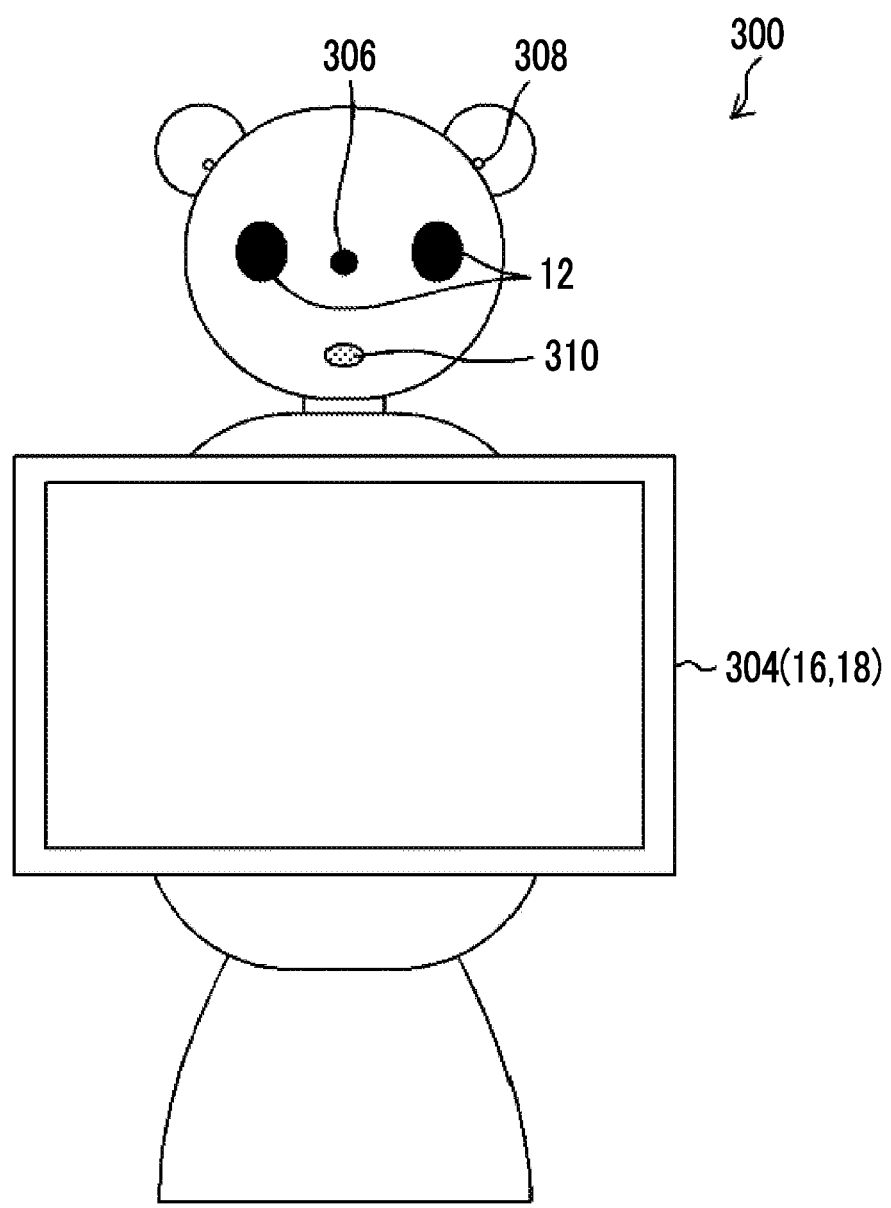
FIG. 20 is a perspective view showing an appearance of an example of the display apparatus of FIG. 19.

FIG. 20 is an external view of the display apparatus 300 in FIG. 19. As shown in FIG. 20, a gaze acquiring unit 12 and a touch panel display 304 are provided on a user-facing side of the display apparatus 300 in this example (the side facing the face of the user). The touch panel display 304 configures the display unit 16 and the operation unit 18. A distance measuring unit 306 for measuring a distance to the user, an audio input unit 308 for inputting audio of the user, and an audio output unit 310 for outputting audio to the user are provided on the user-facing side of the display apparatus 300 in this example. The distance measuring unit 306 may be configured with a distance measuring device that emits infrared light and receives reflected light reflected on the user, thereby acquiring distance information corresponding to a time period after infrared light is emitted and until the infrared light is reflected on the user. The audio input unit 308 may be configured with a microphone. The audio output unit 310 may be configured with a speaker.

The display apparatus 300 in this example is a robot capable of interacting with a person, and may display an image on the display unit 16, recognize a position of the portion (attention portion), to which attention is paid by the user, in the displayed image, and determine the contents of dialogue.

As described above, in addition to the case where there is recognized a position of a portion (attention subject image), to which attention is paid by the user, in the image obtained by imaging the subject in the field of view of the user, an embodiment of the present invention may also be applied to a case where there is recognized a position of a portion (attention target), to which attention is paid by the user, in the non-imaging image. It is needless to say that an embodiment of the present invention may be applied to a case where an image obtained by imaging is displayed and a position of the attention portion in the displayed image is recognized.

Although the embodiments for implementing the present invention have been described above, the present invention is not limited to the above-mentioned embodiments and modifications, and may be modified into various forms without departing from the scope of the present invention.

EXPLANATION OF REFERENCES

10: attention position recognizing apparatus
12: gaze acquiring unit
14: image acquiring unit
16: display unit
18: operation unit
22: gaze analyzing unit
24: image analyzing unit
26: attention position recognizing unit
30: storage unit
100: image pickup apparatus
102: imaging unit
104: imaging control unit
200: smartphone
201: main control unit
202: housing
210: wireless communication unit
220: display input unit
221: display panel
222: operation panel
230: speech communication unit
231: speaker
232: microphone
240: operation unit
241: camera unit
250: storage unit
251: internal storage unit
252: external storage unit
260: external input/output unit
270: GPS receiving unit
280: motion sensor unit
290: power supply unit
300: display apparatus
302: communication unit
304: touch panel display
306: distance measuring unit
308: audio input unit
310: audio output unit
350: database
IMG, IMG1 IMG2, and IMG3: image
MV1, MV2: movement vector
NW: network
OBJ11, OBJ12, OBJ13, OBJ2, and OBJ3: subject image
ROI: attention portion
SP: gaze position
ST1 to STn: GPS satellite

What is claimed is:

1. An attention position recognizing apparatus comprising:
   a gaze analyzing unit that performs detection of a gaze position of a user and determination whether or not the gaze position is stable, as gaze analysis of the user;
   an image acquiring unit that acquires an image;
   an image analyzing unit that performs image analysis of the acquired image; and
   an attention position recognizing unit that recognizes an attention position which is a position of a portion, to which attention is paid by the user, in the image based on a result of the gaze analysis and a result of the image analysis,
   wherein, in a case where the gaze analyzing unit determines that the gaze position is unstable and the image analyzing unit determines that the image is stable, the attention position recognizing unit filters the detected gaze position in time series to be adopted as the attention position.

2. The attention position recognizing apparatus according to claim 1,
   wherein, in a case where it is determined that the gaze position is unstable and it is determined that the image is unstable, the attention position recognizing unit compares a movement of the detected gaze position with a movement in the image and determines whether or not to adopt the detected gaze position as the attention position.

3. The attention position recognizing apparatus according to claim 1,
   wherein, in a case where it is determined that the gaze position is unstable and it is determined that the image is unstable, the attention position recognizing unit estimates an attention portion in the image based on a result of the image analysis and compares a movement of the detected gaze position with a movement of the estimated attention portion in the image, and determines whether or not to use the detected gaze position as the attention position.

4. An image pickup apparatus comprising:
   the attention position recognizing apparatus according to claim 1,
   wherein the image pickup apparatus uses an imaging unit for imaging a subject as the image acquiring unit.

5. The image pickup apparatus according to claim 4,
   wherein at least one of automatic focus adjustment, automatic exposure, or automatic color balance correction is performed using the attention position recognized based on the result of the gaze analysis and the result of analysis of the image obtained by the imaging.

6. A display apparatus comprising:
   the attention position recognizing apparatus according to claim 1; and
   a display unit that displays the image.

7. An attention position recognizing apparatus comprising:
   a gaze analyzing unit that performs detection of a gaze position of a user and determination whether or not the gaze position is stable, as gaze analysis of the user;
   an image acquiring unit that acquires an image;
   an image analyzing unit that performs image analysis of the acquired image; and
   an attention position recognizing unit that recognizes an attention position which is a position of a portion, to which attention is paid by the user, in the image based on a result of the gaze analysis and a result of the image analysis,
   wherein, in a case where the gaze analyzing unit determines that the gaze position is unstable, the attention position recognizing unit compares a movement of the detected gaze position with a movement in the image, and determines whether or not to adopt the detected gaze position as the attention position.

8. An attention position recognizing apparatus comprising:
   a gaze analyzing unit that performs detection of a gaze position of a user and determination whether or not the gaze position is stable, as gaze analysis of the user;
   an image acquiring unit that acquires an image;
   an image analyzing unit that performs image analysis of the acquired image; and
   an attention position recognizing unit that recognizes an attention position which is a position of a portion, to which attention is paid by the user, in the image based on a result of the gaze analysis and a result of the image analysis,
   wherein, in a case where the gaze analyzing unit determines that the gaze position is stable, the attention position recognizing unit increases a weight of the result of the gaze analysis to be larger than a case where the gaze analyzing unit determines that the gaze position is unstable, to recognize the attention position.

9. An attention position recognizing method comprising:
   a step of performing detection of a gaze position of a user and determination whether or not the gaze position is stable, as gaze analysis of the user;
   a step of acquiring an image;
   a step of performing image analysis of the acquired image; and
   a step of recognizing an attention position that is a position of a portion, to which attention is paid by the user, in the image based on a result of the gaze analysis and a result of the image analysis,
   wherein, in a case where it is determined that the gaze position is unstable and it is determined that the image is stable, the step of recognizing the attention position includes filtering the detected gaze position in time series to be adopted as the attention position.

10. A computer-readable non-transitory tangible medium storing a program that causes a computer to execute the attention position recognizing method according to claim 9.

11. An attention position recognizing method comprising:
    a step of performing detection of a gaze position of a user and determination whether or not the gaze position is stable, as gaze analysis of the user;
    a step of acquiring an image;
    a step of performing image analysis of the acquired image; and
    a step of recognizing an attention position that is a position of a portion, to which attention is paid by the user, in the image based on a result of the gaze analysis and a result of the image analysis,
    wherein, in a case where it is determined that the gaze position is unstable, the step of recognizing the attention position includes comparing a movement of the detected gaze position with a movement in the image and determining whether or not to adopt the detected gaze position as the attention position.

12. A computer-readable non-transitory tangible medium storing a program that causes a computer to execute the attention position recognizing method according to claim 11.

13. An attention position recognizing method comprising:
- a step of performing detection of a gaze position of a user and determination whether or not the gaze position is stable, as gaze analysis of the user;
- a step of acquiring an image;
- a step of performing image analysis of the acquired image; and
- a step of recognizing an attention position that is a position of a portion, to which attention is paid by the user, in the image based on a result of the gaze analysis and a result of the image analysis,
- wherein, in a case where it is determined that the gaze position is stable, the step of recognizing the attention position includes increasing a weight of the result of the gaze analysis to be larger than a case where it is determined that the gaze position is unstable, to recognize the attention position.

14. A computer-readable non-transitory tangible medium storing a program that causes a computer to execute the attention position recognizing method according to claim 13.

* * * * *